(12) United States Patent
Ben-Bassat

(10) Patent No.: US 7,620,095 B2
(45) Date of Patent: *Nov. 17, 2009

(54) RF MODEM UTILIZING SAW DEVICE WITH PULSE SHAPING AND PROGRAMMABLE FREQUENCY SYNTHESIZER

(75) Inventor: David Ben-Bassat, Yehud (IL)

(73) Assignee: Vishay Intertechnology Inc, Malvern, PA (US)

( * ) Notice: Subject to any disclaimer, the term of this patent is extended or adjusted under 35 U.S.C. 154(b) by 619 days.

This patent is subject to a terminal disclaimer.

(21) Appl. No.: 11/424,017

(22) Filed: Jun. 14, 2006

(65) Prior Publication Data

US 2007/0291823 A1   Dec. 20, 2007

(51) Int. Cl.
*H04B 15/00* (2006.01)

(52) U.S. Cl. .................. 375/141; 375/238; 375/239; 370/205; 329/313

(58) Field of Classification Search ......... 375/140–143, 375/146, 150, 151, 238, 239; 370/205; 329/313
See application file for complete search history.

(56) References Cited

U.S. PATENT DOCUMENTS

| | | | |
|---|---|---|---|
| 5,892,792 | A | 4/1999 | Walley |
| 6,088,347 | A | 7/2000 | Minn et al. |
| 6,535,545 | B1 | 3/2003 | Ben-Bassat et al. |
| 6,757,334 | B1 | 6/2004 | Feher |
| 6,970,496 | B1 | 11/2005 | Ben-Bassat et al. |
| 2004/0156465 | A1* | 8/2004 | Schmandt .......... 375/376 |

OTHER PUBLICATIONS

Chipcon SmartRF CC2400 Datasheet; Chipcon Inc., version 1.2, Feb. 5, 2004.
Nordic nRF24Z1 Datasheet, Nordic Semiconductor, version 3.1, Jun. 2006.

* cited by examiner

*Primary Examiner*—Kevin Y Kim
(74) *Attorney, Agent, or Firm*—Zaretsky Patent Group PC; Howard Zaretsky

(57) ABSTRACT

A bidirectional direct sequence spread spectrum half-duplex RF modem. that can be applied to transmit and receive numerous types of analog and digital pulse modulation. The modem incorporates a SAW based correlator for performing the spreading and de-spreading functions in the transmitter and receiver. A programmable frequency synthesizer provides the frequency source for various signals in the modem including the local oscillator (LO), IF interrogating pulse and clock signals. An upconverter/downconverter provides frequency translation to the desired frequency band. Pulse gating and interrogating pulse shaping are employed to reduce the spectral side bands of the transmitted spread pulse. The RF modem operates as an analog or digital pulse transmitter and receiver. It is adapted to be generic and is versatile enough to be used in many different types of data communication systems, such as OOK, PWM and PPM. The RF modem can be used as the physical (PHY) layer in a layered communication system such as the ISO OSI communication stack. In an alternative embodiment, the transmission bit rate is increased by using a plurality of correlators wherein each is configured with a unique function (i.e., code) that is orthogonal to the other functions.

24 Claims, 24 Drawing Sheets

| CHANNEL # | LO [MHz] | IF INTERROGATING PULSE (LO/4) [MHz] | RF FREQUENCY (LO+CORRELATOR) [MHz] | M (VCO DIVIDER) | LOGIC CLOCK (LO/32) [MHz] |
|---|---|---|---|---|---|
| 1 | 1920 | 480 | 2408 | 3840 | 60 |
| 2 | 1928 | 482 | 2416 | 3856 | 60.25 |
| 3 | 1936 | 484 | 2424 | 3872 | 60.5 |
| 4 | 1944 | 486 | 2432 | 3888 | 60.75 |
| 5 | 1952 | 488 | 2440 | 3904 | 61 |
| 6 | 1960 | 490 | 2448 | 3920 | 61.25 |
| 7 | 1968 | 492 | 2456 | 3936 | 61.5 |
| 8 | 1976 | 494 | 2464 | 3952 | 61.75 |
| 9 | 1984 | 496 | 2472 | 3968 | 62 |

FIG.9

RF MODEM UTILIZING SAW DEVICE WITH PULSE SHAPING AND PROGRAMMABLE FREQUENCY SYNTHESIZER

REFERENCE TO RELATED APPLICATIONS

This application is related to U.S. application Ser. No. 09/419,824, filed Oct. 15, 1999, entitled "RF Modem Utilizing Saw Resonator and Correlator and Communications Transceiver Constructed Therefrom," now U.S. Pat. No. 6,535,545 and U.S. application Ser. No. 09/688,300, filed Oct. 13, 2000, entitled "RF Modem and Communications Transceiver Utilizing SAW Device and Pulse Shaping," now U.S. Pat. No. 6,970,496, both of which are incorporated herein by reference in their entirety.

FIELD OF THE INVENTION

The present invention relates generally to a Radio Frequency (RF) modem and more particularly to a Surface Acoustic Wave (SAW) based spread spectrum RF modem incorporating pulse shaping circuits and a programmable frequency synthesizer for providing frequency agility to the modem.

BACKGROUND OF THE INVENTION

As the use of computers continues to increase at a rapid rate, the demand for peripherals and systems connected via wireless connections continues to increase. The number of wireless applications is currently increasing at a very high rate in areas such as security alarms, networking, data communications, telephony and computer security.

Wireless communications currently may take many forms such as ultrasonic, IR and RF. A commonly used communication technique in RF wireless communications is spread spectrum. Spread spectrum communication is a communication technique whereby the transmitted signal is spread over a frequency band that is significantly wider than the minimum bandwidth required to transmit the information being sent. As a result of the signal spreading, spread spectrum systems have reduced susceptibility to interference and jamming thus enabling high levels of data integrity and security. Further, since the signal spreading process spreads the transmission power over a wide bandwidth, the power levels at any given frequency within the bandwidth are reduced significantly thereby reducing interference to other radio devices.

Spread spectrum communication systems are generally of the direct sequence (DS) type, the frequency hopping (FH) type or are a hybrid of the two that combines DS and FH. In direct sequence spread spectrum communications, a data signal is modulated with a pseudo random chip code so as to generate a transmitted signal whose frequency spectrum is spread over a wide bandwidth. The transmitted signal has a low spectral density and appears as noise to receivers lacking the code sequence. Thus, spread spectrum communications provides increased security for the data transmitted and reduced interference with other transmitters and receivers operating in the same environment.

The role of the transmitter in a spread spectrum communications system is to spread the signal in accordance with the data to be transmitted. Each bit or set of bits to be transmitted is converted into a plurality of chips having a much wider bandwidth than the original data. The spreading is performed in accordance with the code sequence chosen for the system.

The role of the receiver is to de-spread the spread spectrum signal in order to recover the original data signal. In direct sequence spread spectrum, the de-spreading of the signal is accomplished by correlating the received signal with a reference code matching the pseudo noise code used by the transmitter to transmit the information. As a consequence of de-spreading the signal, any interfering signals are also spread. The interfering signals typically comprise pseudo-random noise rather than cyclic noise that is easier to combat.

One technique for spread spectrum correlation is to convert the received signal into digital form before inputting it to a digital matched filter. Other spread spectrum correlation techniques utilize surface acoustic wave (SAW) devices to perform correlation on a received spread spectrum signal. SAW devices, constructed on quartz wafers having a thickness of 0.5 mm, permit propagation of acoustical waves on the free surface. The SAW device functions to convert electrical signals into acoustical signals and back again via piezo electric transducers.

SAW devices are useful in a variety of applications including spread spectrum correlators since they are generally capable of operating over a wide bandwidth. A SAW correlator device is a passive component constructed to recognize a specific sequence of code chips (similar in operation to a digital matched filter correlator) via correlation of phase shifts in an RF signal. The SAW correlator functions analogously to a delay line matched filter. It consists of many delay elements each having a delay period equal to the period of the transmitted code clock such that, at any time, each element corresponds to a single chip of the received signal.

As the received signal propagates through the SAW device, the phase structure of each element is added in or out of phase with the propagated wave. The outputs of all the elements may be summed to reach a maximum at a total correlation value. When the phase shift structure of all the elements matches the phase shifts of the propagated wave, a maximum sum, i.e., correlation, is achieved.

Since SAW devices are by nature fixed devices, a SAW correlator is usually programmed at the time of manufacture to match a single predetermined chip code sequence. The phase shift structure of the SAW device is programmed at the time of construction Through transducers placed in each element to produce an elemental phase match and cannot be changed once manufactured. Thus SAW devices generally permit correlation with a single code sequence.

Prior art SAW based transceivers that use SAW technology for the spreading and de-spreading function are mostly based on a single central frequency that is fixed. An advantage of such a fixed single frequency system is that it is relatively simple, straight forward, easy to implement and permits a fairly quick wake up time. A major drawback to such systems, however, is that the transmission frequency is fixed. The transceiver was thus limited to operation at only one frequency yielding a single operating channel. Operating with only a single channel poses several challenges in areas that are crowded with RF transmissions. In the event other transmissions occupy the single operating channel, interference is inevitable with the potential for a blocked channel. In extreme cases, the inability to hop to an alternative frequency channel can potentially disable the wireless communications link altogether.

It would therefore be desirable to have an RF modem that utilizes direct sequence spread spectrum techniques that has frequency agility, is simple to implement and can be constructed at low cost and small size. It is also desirable that such an RF modem utilize a SAW device for the transmitter correlator and receiver correlator thereby reducing the size and cost of the modem.

SUMMARY OF THE INVENTION

The present invention is a bidirectional direct sequence spread spectrum half-duplex RF modem incorporating a programmable frequency synthesizer for providing frequency agility. The RF modem can be utilized to transmit and receive numerous types of analog and digital pulse modulation. While the RF modem can be adapted to operate in numerous frequency ranges, an example is presented herein that is adapted to operate in the 2400 to 2483.5 MHz Industrial, Scientific and Medical (ISM) band of frequencies. In addition, examples are provided that utilize the RF modem of the present invention to construct various types of data communications systems.

A key feature of the present invention is the incorporation in the RF modem of a Surface Acoustic Wave (SAW) device fabricated on a monolithic substrate. The SAW device is used to form the correlator for use in both the transmit and receive portions of the modem. Other key features of the invention include the use of a programmable frequency synthesizer for providing frequency agility, relative ease of manufacture and the very low amount of power consumed by the modem.

The RF modem is constructed to operate as a pulse transmitter and receiver. It is adapted to be generic in the sense that it is versatile enough to be used in many different types of data communication systems, several examples of which are presented below. The RF modem can be used as the physical (PHY) layer in a layered communication system such as the ISO OSI communication stack. As an example, the pulse transmitter RF modem can be used to provide various modulation schemes including, but not limited to On/Off Keying (OOK), Pulse Width Modulation (PWM), Pulse Position Modulation (PPM) or any other type of analog or digital pulse modulation.

In a first embodiment, the transmit and receive portion of the modem utilize the output of a programmable frequency synthesizer. A frequency control signal output by the controller determines the LO frequency and the corresponding RF output frequency. The output of the synthesizer is switched on and off in accordance with the data to be transmitted. The LO signal, IF interrogating pulse and clock signals are generated from the output of the frequency synthesizer. The interrogating pulse is input to the SAW correlator that functions to output the spreading waveform sequence. The spreading sequence is upconverted and amplified before being transmitted via an antenna.

At the receiver, the signal received from the antenna is amplified by a Low Noise Amplifier (LNA). The amplified signal is downconverted and then input to the matched filter/correlator where a match with the spreading sequence is detected. If a match is detected, a de-spreading pulse is output representing the original pulse. The output of the correlator is input to a peak detector that functions to detect, in a either a linear or non-linear fashion the envelope of the received signal. A dynamic reference signal is generated and used to bias the threshold used to generate the binary output data signal.

The output power PT and processing gain of the RF modem of the present invention can be configured in accordance with the particular application. Together, the effective output power $P_{TEFF}$ may be on the order of 30 dBm. The maximum pulse rate achievable with the example RF modem presented herein constructed in accordance with the present invention is approximately 8 Mpps.

The RF modem comprises an upconverter/downconverter which functions to translate the spread pulse to/from a higher frequency band using the LO signals output from the frequency synthesizer. In addition, several techniques are used to narrow the frequency spectrum of the transmitted pulse. An interrogating pulse shaping circuit functions to smooth the contour of the interrogating pulse input to the SAW device. In addition, the structure of the SAW filter is adapted to smooth the transitions and discontinuities of the spreading waveform. Further, a pulse gating circuit functions to reduce the RF leakage generated by the SAW filter.

In a second embodiment, the transmission bit rate is increased by using a plurality of correlators wherein each is configured with a unique function (i.e., code) that is orthogonal with all other functions, i.e., they have near zero cross correlations with each other. The host is adapted to provide N data input and output lines. Each correlator having its own data input and output signal lines. The oscillator signal is generated by the frequency synthesizer which is common to all correlators. An RF power splitter/combiner functions to combine the N transmission signals into a combined transmission signal which is upconverted and to downconvert the receive combined signal before splitting it into multiple receive signals that are then fed to each correlator.

The RF modem of the present invention has a benefit of being relatively inexpensive to implement for the following reasons: (1) the size of both the required silicon and the SAW correlator device are relatively small resulting in inexpensive manufacturing and high yield; (2) the high yield, as well as the simplicity of the devices, results in relatively simple testing of the components; and (3) the size of the resulting dies enables standard, inexpensive packaging.

The use of direct sequence spread spectrum technique provides numerous advantages, including the following: (1) the modem is adapted to transmit and receive very narrow pulses which is very desirable for pulse transceiving; (2) inherent immunity to interference; (3) inherent filtering of out of band noise; (4) inherent spreading of in-band noise; (5) a higher dynamic range available for communication; and (6) power savings resulting from fast oscillator wake-up time.

In addition, the RF modem of the present invention is capable of operating at any desired frequency band via the upconverter/downconverter and comprises circuitry to significantly reduce out of band RF energy. A further advantage is frequency agility which enables the RF modem to hop from one channel to another in the event of interference or for any other reason.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is therefore provided in accordance with the invention, a direct sequence spread spectrum radio frequency (RF) modem comprising a programmable frequency synthesizer adapted to generate an interrogating pulse and a local oscillator (LO) signal, the frequency of the interrogating pulse and LO signals determined in accordance with a frequency control signal, a pulse generator adapted to generate a shaped pulse from the interrogating pulse, the pulse generator comprising a first pulse shaping circuit adapted to shape the contour of the shaped pulse, a pulse spreader adapted to spread the shaped pulse with a spreading code sequence waveform so as to generate a spread shaped pulse, a transmitter circuit including an upconverter for mixing the spread shaped pulse with the local oscillator (LO) signal having an LO frequency to generate a spread spectrum transmission signal at an RF frequency, a receiver circuit including a downconverter for mixing a received signal with the LO signal so as to generate a received spread pulse at the IF frequency, a correlator adapted to de-spread the received spread pulse in accordance with the code sequence so as to generate a correlator signal and a detector adapted to generate an output signal in response to the correlator signal.

There is also provided in accordance with the invention, a method of modulating and demodulating a direct sequence spread spectrum signal, the method comprising the steps of generating an interrogating pulse and a local oscillator (LO) signal, the interrogating pulse and LO signals determined in accordance with a frequency control signal, generating a shaped pulse from the interrogating pulse, wherein the contours of the pulse are shaped, spreading the shaped pulse with a spreading code sequence waveform and generating a spread pulse therefrom, mixing the spread pulse with the local oscillator (LO) signal having an LO frequency and generating therefrom a spread spectrum transmission signal at an RF frequency, mixing a received signal with the LO oscillator signal and generating therefrom a received spread pulse at an IF frequency, de-spreading the spread spectrum transmission signal in accordance with the code sequence and generating a correlator signal therefrom and detecting an output signal in response to the correlator signal.

There is further provided in accordance with the invention, a On/Off Keying (OOK) direct sequence spread spectrum radio frequency (RF) transceiver comprising an input circuit for generating a fixed duration data input signal in accordance with input data to be transmitted and an RF modem comprising a programmable frequency synthesizer adapted to generate an interrogating pulse and a local oscillator (LO) signal, the frequency of the interrogating pulse and the LO signal determined in accordance with a frequency control signal, a pulse generator adapted to generate a shaped pulse in response to the data input signal from the interrogating pulse having an IF frequency, the pulse generator comprising a first pulse shaping circuit adapted to shape the contour of the shaped pulse, a pulse spreader adapted to spread the shaped pulse with a spreading code sequence waveform so as to generate a spread pulse, a transmitter circuit including an upconverter for mixing the spread pulse with the local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal and a detector adapted to generate a data output signal in response to the correlator signal.

There is also provided in accordance with the invention, a Pulse Width Modulation (PWM) direct sequence spread spectrum radio frequency (RF) transceiver comprising an input circuit for generating a pulse width modulated data input signal in accordance with an analog input signal to be transmitted, an RF modem comprising a programmable frequency synthesizer adapted to generate an interrogating pulse and a local oscillator (LO) signal, the frequency of the interrogating pulse and the LO signal determined in accordance with a frequency control signal, a pulse generator adapted to generate a shaped pulse in response to the data input signal from the interrogating pulse having an IF frequency, the pulse generator comprising a first pulse shaping circuit adapted to shape the contour of the shaped pulse, a pulse spreader adapted to spread the shaped pulse with a spreading code sequence waveform so as to generate a spread pulse, a transmitter circuit including an upconverter for mixing the spread pulse with the local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal, a detector adapted to generate an output signal in response to the correlator signal and an output circuit operative to integrate the output signal so as to generate an analog output signal therefrom.

There is further provided in accordance with the invention, a Pulse Position Modulation (PPM) direct sequence spread spectrum radio frequency (RF) transceiver comprising an input circuit for generating a pulse position modulated data input signal in accordance with an analog input signal to be transmitted, an RF modem comprising a programmable frequency synthesizer adapted to generate an interrogating pulse and a local oscillator (LO) signal, the frequency of the interrogating pulse and the LO signal determined in accordance with a frequency control signal, a pulse generator adapted to generate a shaped pulse in response to the data input signal from the interrogating pulse having an IF frequency, the pulse generator comprising a first pulse shaping circuit adapted to shape the contour of the shaped pulse, a pulse spreader adapted to spread the shaped pulse with a spreading code sequence waveform so as to generate a spread pulse, a transmitter circuit including an upconverter for mixing the spread pulse with the local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal, a detector adapted to generate an output signal in response to the correlator signal and an output circuit operative to threshold the output signal against a ramp function so as to generate an analog output signal therefrom.

There is also provided in accordance with the invention, a direct sequence spread spectrum radio frequency (RF) modem comprising a programmable frequency synthesizer operative to generate an interrogating pulse and a local oscillator (LO) signal, the frequency of the interrogating pulse and LO signals determined in accordance with a frequency control signal, a plurality of N transmit/receive circuits, each the transmit/receive circuit comprising a pulse generator adapted to generate a shaped pulse from the interrogating pulse, the pulse generator comprising a first pulse shaping circuit adapted to shape the contour of the shaped pulse, a pulse spreader adapted to spread the shaped pulse with a spreading code sequence waveform so as to generate a spread pulse, a correlator adapted to de-spread the spread pulse signal in accordance with the code sequence so as to generate a correlator signal, a detector adapted to generate an output signal in response to the correlator signal, wherein the correlator in each transmit/receive circuit is configured with a unique function substantially orthogonal to functions in other correlators, means for combining and transmitting the N spread pulse signals generated by the N transmit/receive circuits as a combined transmission signal, a transmitter circuit including an upconverter for mixing the spread pulse with the LO signal so as to generate a spread spectrum transmission signal at an RF frequency, means for receiving and splitting the combined transmission signal into N receive signals, a receiver circuit including a downconverter for mixing a received signal with the LO signal so as to generate a received spread pulse at the IF frequency and wherein N is a positive integer.

BRIEF DESCRIPTION OF THE DRAWINGS

The invention is herein described, by way of example only, with reference to the accompanying drawings, wherein:

FIG. 9 is a table illustrating the frequencies generated by the frequency synthesizer for different channels;

DETAILED DESCRIPTION OF THE INVENTION

Notation Used Throughout

Figure 1:
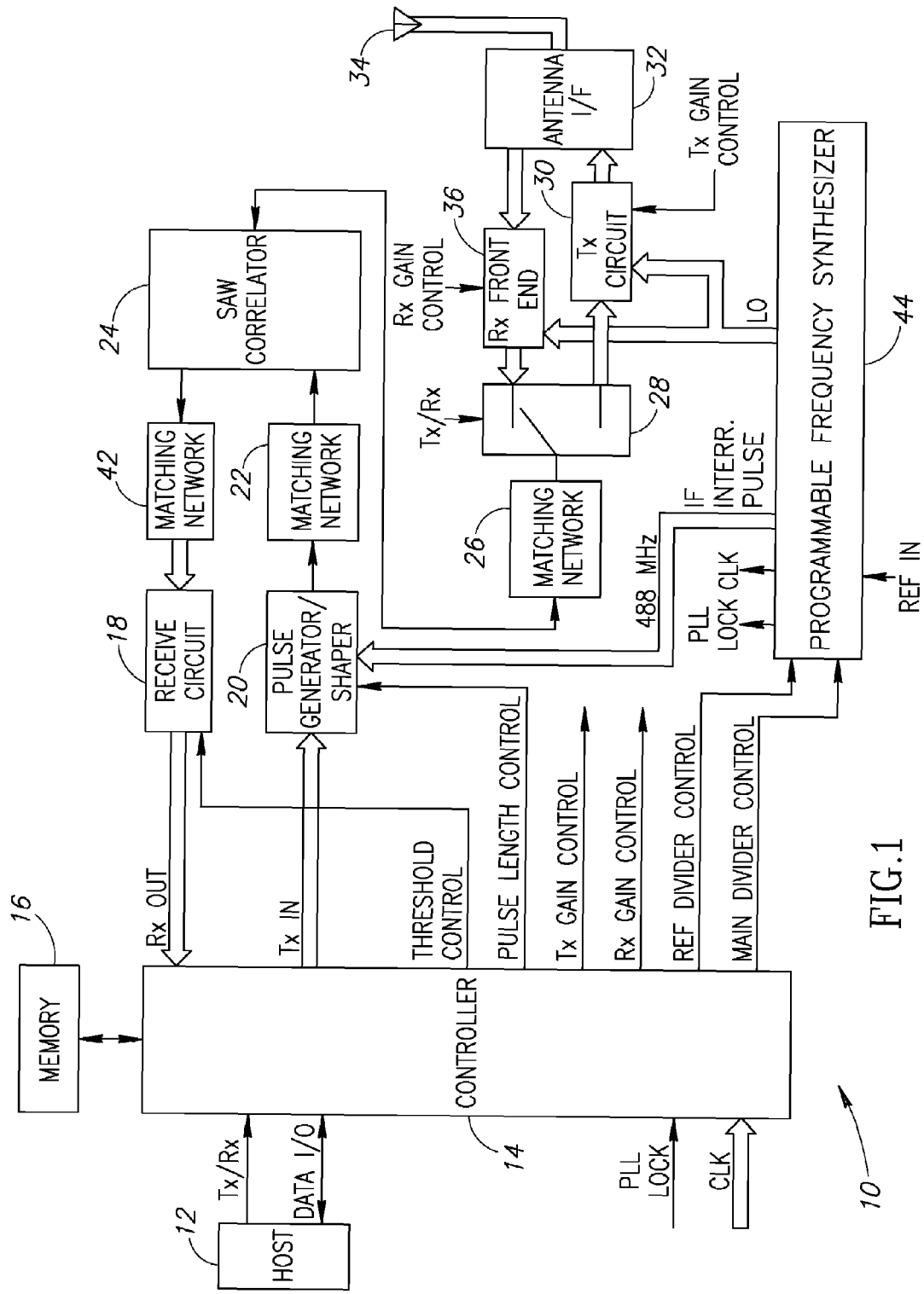
FIG. 1 is a block diagram illustrating a first embodiment of an RF modem incorporating a SAW based correlator and programmable frequency synthesizer constructed in accordance with the present invention.

The following notation is used throughout this document.

| Term | Definition |
| --- | --- |
| ASIC | Application Specific Integrated Circuit |
| ASK | Amplitude Shift Keying |
| BPSK | Binary Phase Shift Keying |
| CMOS | Complementary Metal Oxide Semiconductor |
| CNR | Carrier to Noise Ratio |
| DS | Direct Sequence |
| DSP | Digital Signal Processor |
| ECL | Emitter Coupled Logic |
| FCC | Federal Communications Commission |
| FET | Field Effect Transistor |
| FH | Frequency Hopping |
| FM | Frequency Modulation |
| FPGA | Field Programmable Gate Array |
| HDL | Hardware Description Language |
| IC | Integrated Circuit |
| IF | Intermediate Frequency |
| IR | Infra Red |
| ISI | Intersymbol Interference |
| ISM | Industrial, Scientific and Medical band |
| ISO | International Standard Organization |
| LNA | Low Noise Amplifier |
| LO | Local Oscillator |
| OOK | On/Off Keying |
| OSI | Open Systems Interconnection |
| PC | Personal Computer |
| PLL | Phase Lock Loop |
| PPM | Pulse Position Modulation |
| PWM | Pulse Width Modulation |
| RF | Radio Frequency |
| S/H | Sample and Hold |
| SAW | Surface Acoustic Wave |
| SNR | Signal to Noise Ratio |
| USB | Universal Serial Bus |
| VCO | Voltage Controlled Oscillator |

Detailed Description of the Invention

The present invention is a bidirectional direct sequence spread spectrum half-duplex RF modem. The RF modem can be applied to transmit and receive numerous types of analog and digital pulse modulation. A first embodiment is presented comprising the core RF modem circuitry intended to operate at an RF frequency in the 2.4 GHz Industrial, Scientific and Medical (ISM) band of frequencies. An upconverter/downconverter is used for translating the resultant spread pulse to a desired frequency band. While the RF modem can be adapted to operate in numerous frequency ranges, an example of the first embodiment is presented herein that is constructed to operate in the 2.4 GHz ISM band of frequencies. It is not intended, however, that the present invention be limited to such example implementations shown herein, as one skilled in the art can apply the principles of the present invention to construct RF modems having other frequencies of operation as well.

In addition, a second embodiment is presented whereby a plurality of pulse spreaders (i.e. correlators) are used in combination to increase the data rate. In addition, several application examples are provided that utilize the RF modem of the present invention to construct various types of data communications systems, such as OOK, PWM and PPM communications systems.

Several key features of the RF modem of the present invention include: (1) the incorporation in the RF modem of a Surface Acoustic Wave (SAW) device fabricated on a single monolithic substrate which is used to form the correlator in the transmitter and receiver portions of the modem; (2) the very low amount of power consumed by the modem; (3) the very narrow pulse that is received during operation which results in improved SNR; and (4) the use of a programmable frequency synthesizer for providing frequency agility to the RF modem which can be exploited in the presence of severe interference.

In addition, the RF modem incorporates circuitry to reduce the RF energy of the transmitted pulse outside of the desired frequency band. An interrogating pulse shaping circuit is employed which functions to smooth the contour of the interrogating pulse input to the SAW device. In addition, the structure of the SAW correlator is adapted to smooth the transitions and discontinuities of the spreading waveform. Further, a pulse gating circuit functions to reduce the RF leakage generated by the SAW correlator.

First Embodiment RF Modem

A block diagram illustrating a first embodiment of an RF modem incorporating a SAW based correlator and programmable frequency synthesizer constructed in accordance with the present invention is shown in FIG. 1. The RF modem, generally referenced 10, comprises transmit circuitry and receive circuitry. A portion of the modem is shared by both the transmitter and the receiver, namely the SAW correlator device. Note that single width arrows denote either control signals or single ended signals. Double width arrows denote differential signals.

The RF modem 10 is constructed to operate as a pulse transmitter and receiver with frequency agility. It is adapted to be generic in the sense that it is versatile enough to be used in many different types of data communication systems, several examples of which are presented infra. The RF modem can be used as the physical (PHY) layer in a layered communication system such as the ISO OSI communication stack.

As an example, the pulse transceiver RF modem 10, can be used to construct different types of communication systems, such as On/Off Keying (OOK), Pulse Width Modulation (PWM), Pulse Position Modulation (PPM) or other types of pulse modulation. Note that one skilled in the art can apply the RF modem of the present invention to construct other types of pulse modulation based communication systems as well. The transmit path comprises host 12, controller 14, frequency synthesizer 44, pulse generator/shaper 20, matching networks 22, 26, SAW correlator 24, TX/RX switch 28, TX circuit 30 antenna I/F 32 and antenna 34. The receive path comprises the antenna 34, antenna I/F 32, RX front end 36, TX/RX switch 36, matching networks 26, 42, SAW correlator 24, receive circuit 18, controller 14 and host 12. The transmit path of the RF modem will be described first followed by the receive path.

The data to be transmitted by the modem is provided by the host 12 and is input to the controller 14. The controller comprises circuitry to generate the timing and control signals used in the modem and utilizes memory 16. The controller also provides the interface to the host device. In the example modem presented herein, the controller is implemented as a state machine. Note that one skilled in the art, however, can construct the controller in numerous other ways without departing from the scope of the invention.

The host may comprise any suitable digital data source such as a microcontroller, microprocessor, microcomputer, digital signal processor (DSP), PC or other data computing means. The data rate output of the host can be any rate that the transmitter can support. In the example modem described herein, the data rate output from the host in the example modem presented herein is a maximum of 8 Mbps.

A programmable frequency synthesizer 44 functions to generate the central frequency oscillator and transmit and receive local oscillator (LO) clock signals used by the modem. In the example RF modem shown herein, the frequency synthesizer is adapted to generate the appropriate central frequency and LO signals to output an RF signal in the 2.4 GHz ISM band.

In the embodiment shown herein, a SAW based correlator is used having a central operating frequency of 488 MHz, bandwidth of 16 MHz and processing gain of 6 dB. Further, the example is adapted to operate in the 2.4 GHz ISM band.

The pulse generator/shaper 20 functions to gate the IF signal (i.e. interrogating pulse) in accordance with the input data to be transmitted. The data to be transmitted TX IN is provided by the controller. The SAW device 24 is a three port device and functions as the spreading and de-spreading element. Matching networks 22, 26, 42 function to electrically interface the SAW device to the pulse generator, TX circuit 30, RX front end circuit 36, and the receive circuit 18, respectively.

The RF modem comprises upconverter/downconverter means for translating the spread pulse to/from a higher frequency. The frequency synthesizer functions to generate the intermediate frequency (IF) and local oscillator (LO) signals used by the TX and RX circuits of the modem.

In the transmit direction, the output of the SAW correlator is input to the TX circuit via the TX/RX switch 28. The TX circuit functions to amplify and upconvert the pulse to the desired frequency band (e.g., 2.4 GHz). The resultant signal is amplified and output to the antenna 34 via the antenna interface 32.

In the receive direction, the signal from the antenna is amplified by the RX front end circuit 36 and mixed down to IF before being input to the SAW correlator via the TX/RX switch. The resultant de-spread signal is input to the receive circuit 18 which functions to recover the received data.

The RF modem operates as a pulse transmitter/receiver wherein a signal output by a frequency synthesizer is modulated in on/off fashion by an RF switch. The frequency synthesizer functions to provide the source for the generation of (1) the IF oscillator signal used to generate the interrogation pulse to the SAW correlator, (2) the LO signal used in the upconversion and downconversion processing, and (3) the basic clock signals for the state machine in the controller. The output of the frequency synthesizer is used by the pulse generator in generating the interrogation pulse.

Figure 2:
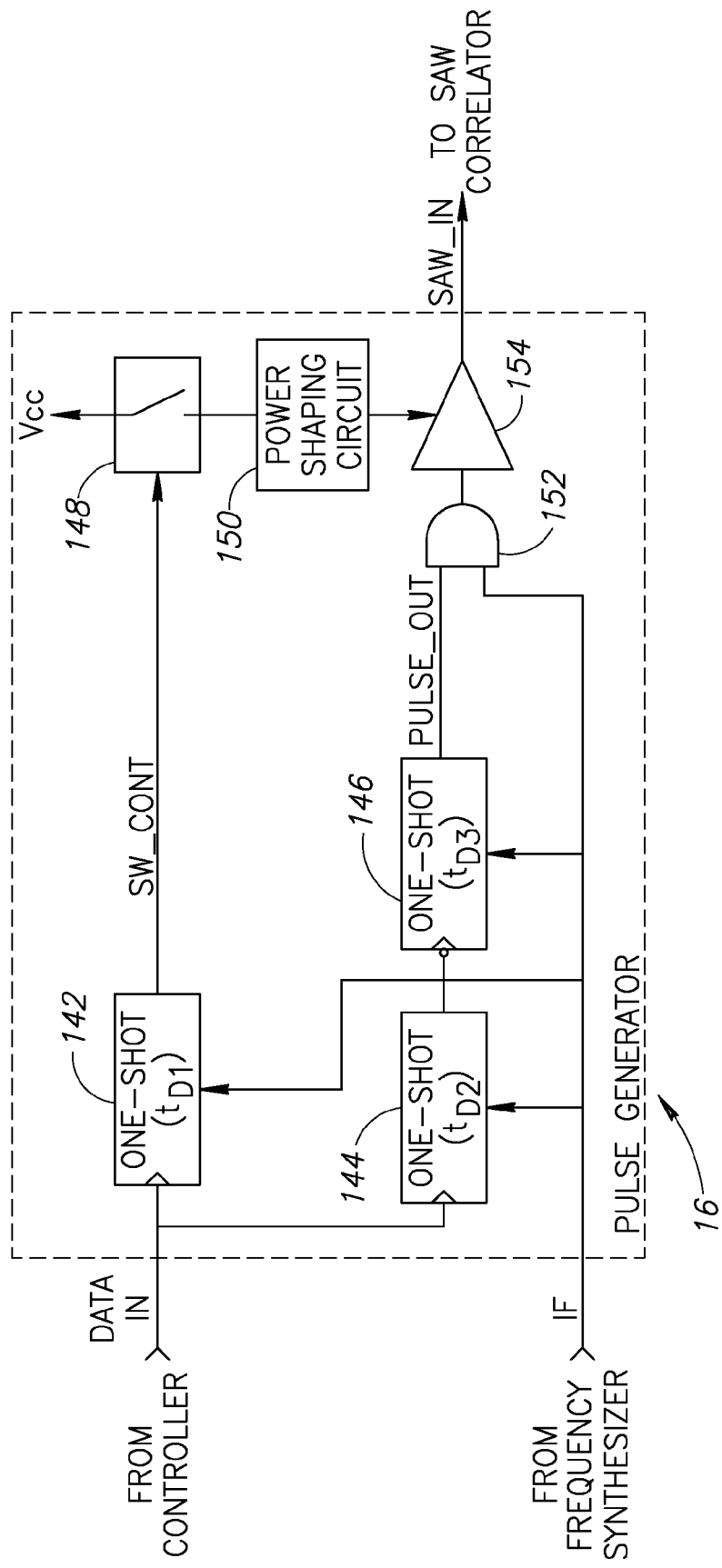
FIG. 2 is a block diagram illustrating the pulse generator circuit of the RF modem in more detail.

A block diagram illustrating the pulse generator circuit of the RF modem in more detail is shown in FIG. 2. The pulse generator/shaper 20 functions to generate an approximately 100 ns RF pulse that is used to interrogate the SAW correlator. The circuitry of the pulse generator is positive edge triggered, i.e. a low to high transition of the data in line starts the sequence of generating a pulse. Note that the pulse generator can be implemented as a state machine comprising a timing mechanism that switches on and off the analog elements that generate the pulse. The pulse generator shown is an alternative implementation constructed using hardware elements rather than a state machine. Note that the state machine can be implemented using hardware, software or a combination of hardware and software.

The input data from the host triggers two one shot devices 142, 144 (i.e. monostable multivibrators). A first non-retriggerable one shot 142 generates a signal SW_CONT having a duration $t_{D1}$. A second non-retriggerable one shot 144 generates a pulse having a duration $t_{D2}$ which subsequently triggers a third non-retriggerable one shot 146. The output pulse labeled PULSE_OUT has a high duration of $t_{D3}$. One-shot 144 provides the setup time for the SAW amplifier 154 to stabilize.

The PULSE_OUT signal from one-shot 146 is gated with the RF oscillator signal via AND gate 152. The resulting gated interrogating pulse is input to a non-differential power amplifier 154 which is matched to provide maximum power to the input of the SAW correlator. The output of the amplifier 154, labeled SAW_IN, is input to the SAW correlator.

In accordance with the present invention, the contour of the interrogating pulse is shaped so as to lower the spectral density of the side band frequencies. A power shaping circuit 150 controls the power to the amplifier 154 to give the interrogating pulse a ramp-up and ramp-down envelope. Power from $V_{CC}$ to the shaping circuit is controlled by the SW_CONT signal from one-shot 142.

Figure 3:
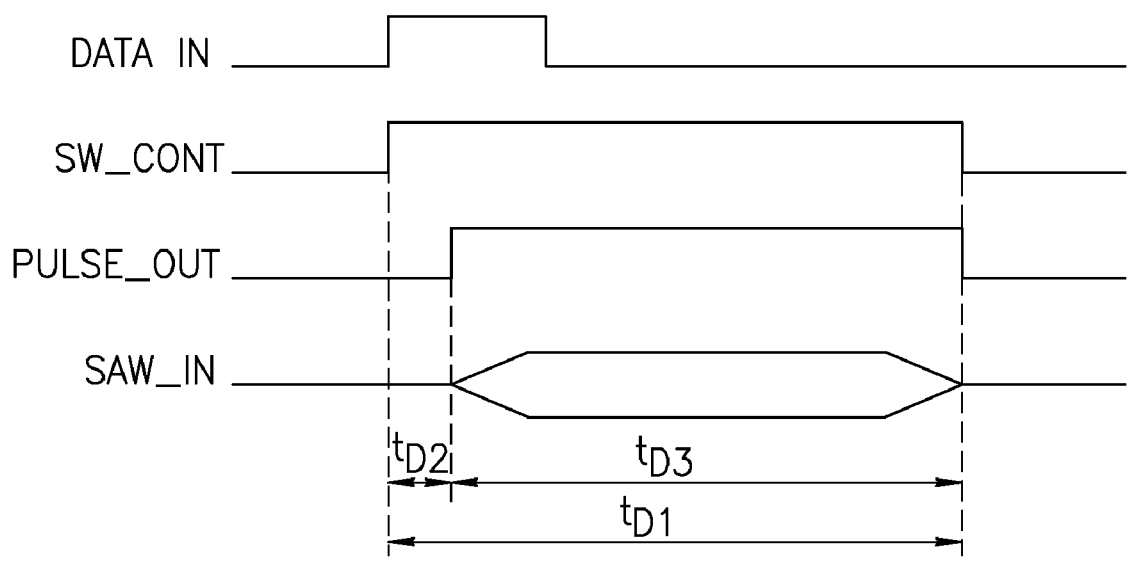
FIG. 3 is a diagram illustrating waveform traces of signals of the pulse generator circuit.

A diagram illustrating waveform traces of the signals of the pulse generator circuit is shown in FIG. 3. The resulting interrogating pulse SAW_IN comprises three portions. In the example modem presented herein, the ramp-up and ramp-down portions have a duration of approximately 30 ns while the constant inner portion has a duration of approximately 115 ns (i.e. 56 cycles of the IF). In the example implantation presented herein, the duration of the interrogating pulse is less than 20% of the duration of the resultant signal output of the SAW correlator device.

Alternatively, the interrogating pulse is generated using an RF switch adapted to create short pulses of the RF signal. The RF switch preferably is adapted to provide high isolation of at least 50 dB from input to output when not in an 'on' state. The input impedance of the switch is preferably no lower than 10 kOhm and no higher than 5 pF. The output impedance is preferably 50 Ohm. A positive input on the control input on the Data In signal places the switch in the on or conducting state. Alternatively, the switch can be adapted to turn on when a negative or zero signal is input to the control input.

Thus, in response to the Data In signal, the switch is adapted to output a low power pulse carrier signal, i.e., the interrogating pulse. This signal is then amplified by a switched amplifier. The amplifier is adapted to amplify the weak −30 dBm input signal output from the switch to an output power of approximately 10 to 15 dBm. The central frequency of operation of the amplifier is 488 MHz with a bandwidth of at least 50 MHz. The output impedance is preferably 50 Ohm. The wake up time of the amplifier is preferably 100 ns, i.e., the amplifier is stable according to specification within 100 ns. The high gain of the amplifier is required to overcome the insertion loss of the SAW correlator that may be as high as 15 to 20 dB.

A key feature of the RF modem of the present invention is that a single SAW correlator device is used for both transmission and reception. When the modem is in the transmitting state, the interrogating pulse is input to the tuning/impedance matching network 22 (FIG. 1). The matching circuit functions to match the impedance at the output of the pulse generator to the SAW device such that the input impedance seen by the SAW device is 50 Ohms.

In the embodiment shown herein, a SAW based correlator is used having a central operating frequency of 488 MHz, bandwidth of 16 MHz and processing gain of 6 dB. The SAW based correlator described herein is presented for illustrative example purposes only. It is not intended that the invention be limited to the SAW correlator presented herein. It is appreciated that one skilled in the art can implement the RF modem of the present invention using SAW based correlators having any desired central frequency. In general, current technology permits SAW correlators to be implemented having central frequencies from 30 MHz to 1 GHz.

The SAW correlator device is operative to output a signal having a shape in accordance with characteristics of the SAW device. The modem, however, can be constructed using any desired spread spectrum code as well. In response to the input interrogating pulse from the matching circuit, the SAW device is operative to output a spreading waveform much wider in time duration, e.g., 300 to 1000 ns. The output of the SAW correlator 24 (FIG. 1) is input to a second tuning/impedance matching network 26 (FIG. 1) which functions to provide a 50 Ohm output impedance. Note that the insertion loss of the SAW correlator may be as high as 15 to 20 dB.

SAW Correlator Device

Figure 4:
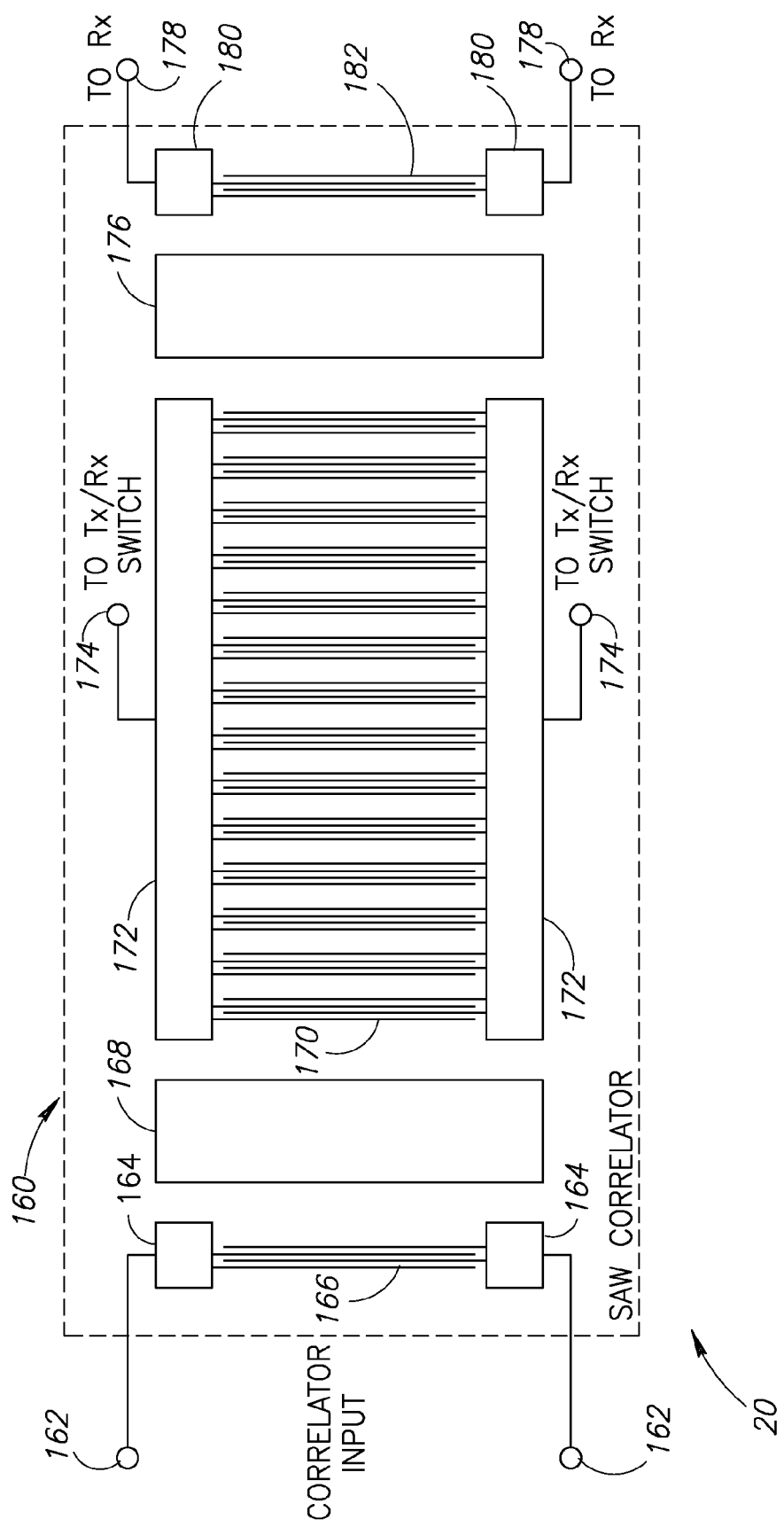
FIG. 4 is a pattern diagram illustrating the surface acoustic wave (SAW) correlator.

The SAW correlator device of the present invention will now be described in more detail. A pattern diagram illustrating the surface acoustic wave (SAW) correlator device is shown in FIG. 4. The SAW correlator, generally referenced 24, is constructed on a single piezoelectric substrate preferably made of quartz crystal, ST cut. The substrate may be constructed of materials other than quartz so long as the material used has acceptable temperature-stable properties. The SAW correlator is a passive element which functions as a direct sequence spread spectrum spreading and de-spreading element. Note that in the example presented herein the SAW correlator is adapted to fit onto a die size of approximately 4 mm².

The signal electrodes of the correlator have comb shapes for converting an electrical signal into surface acoustic waves. Two sets of signal electrodes, separated from each other by a predetermined distance, are operative to convert the surface acoustic waves into an electrical signal. Both signal electrodes are formed on the quartz crystal substrate using well known lithography techniques and are constructed of any suitable conductive material such as aluminum (Al), gold (Au), silver (Ag), copper (Cu) or the like having low electrical resistivity. Aluminum (Al) is preferable as it has the advantages of being low cost and etches easily.

The central frequency $f_c$ of the correlator is 488 MHz with an accuracy $\Delta f$ of $\pm 0.1$ MHz. The input and output impedance of the correlator is adapted to be approximately 50 Ohm.

It is appreciated that correlators having different codes, different rates, different frequencies of operation and using different modulations are known in the art and may be used with the RF modem without departing from the spirit and scope of the present invention.

The correlator 160 comprises input terminals 162 connected to input signal electrodes 164. The input electrodes comprise interdigital transducers 166 having a comb shape that function to form an input transducer. A conductive surface 168 is placed in series with the input transducer and functions to absorb RF energy to help prevent RF energy leaking from the input to the output. Signal electrodes 172 are placed in series with the absorbing surface 168.

The output signal electrodes are connected to output terminals 174 that are coupled to the TX/RX switch. The output signal electrodes comprise interdigital transducers 170 having a comb shape for converting an electrical signal into surface acoustic waves thus forming an output transducer.

A conductive surface 176 is placed in series with the output transducer. The Rx transducer, in series with the conductive surface 176, comprises signal electrodes 180 and interdigital transducers 182.

In the transmit direction, the interrogating pulse enters the SAW device via the correlator input and is spread by the output transducer. The signal electrodes of the input and output interdigital transducers, separated from each other by a predetermined distance, are operative to convert the surface acoustic waves into an electrical signal. The resulting electrical spread pulse developed across the output terminal 174 is input to the transmit RF front end circuit via the TX/RX switch.

The signal electrodes and absorbing surfaces are formed on the quartz crystal substrate using well known lithography techniques and are constructed of any suitable conductive material such as aluminum (Al), gold (Au), silver (Ag), copper (Cu) or the like having low electrical resistivity. Aluminum (Al) is preferable as it has the advantages of being low cost and etches easily.

In the receive direction, the spread pulse received from the antenna is input to the center transducer via the TX/RX switch which now functions as an input transducer rather than an output transducer. The input transducer functions to de-spread the pulse whereby the resulting de-spread pulse is output from the Rx transducer 182 to the receive circuit.

All the transducers are formed on the piezoelectric substrate so as to function as a surface acoustic wave correlator or matched filter.

Figure 5:
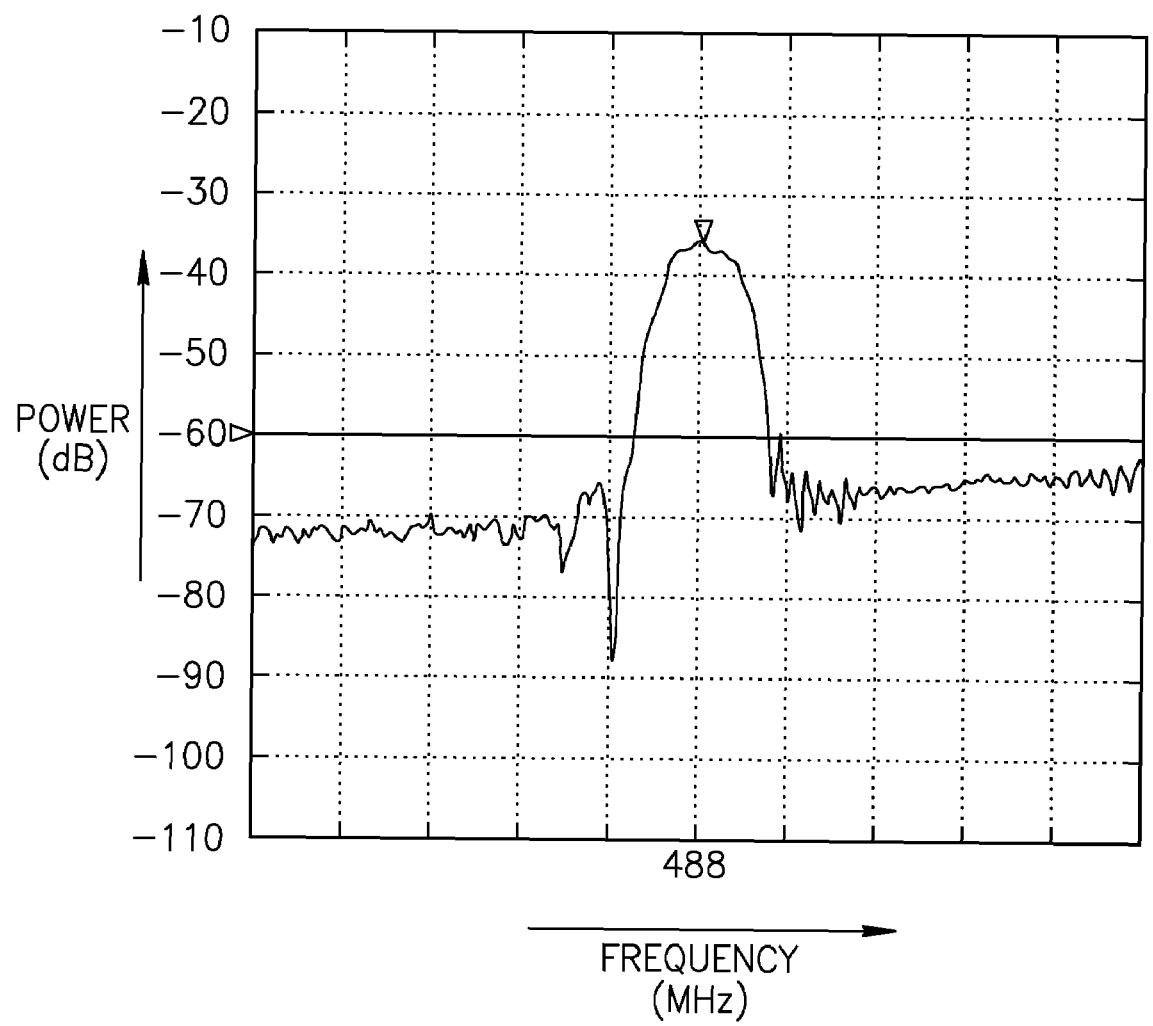
FIG. 5 is a graph illustrating the measured S21 parameter frequency response of the example correlator presented herein.

Note that the SAW correlator device of the present invention is a bidirectional device. The output of the correlator depends on the direction of signal flow. A graph illustrating the measured S21 parameter frequency response of the correlator is shown in FIG. 5. The frequency response was measured from an implementation of the invention using a 2-port network analyzer. Note that the bandwidth at −25 dB is approximately 16 MHz.

Figure 7:
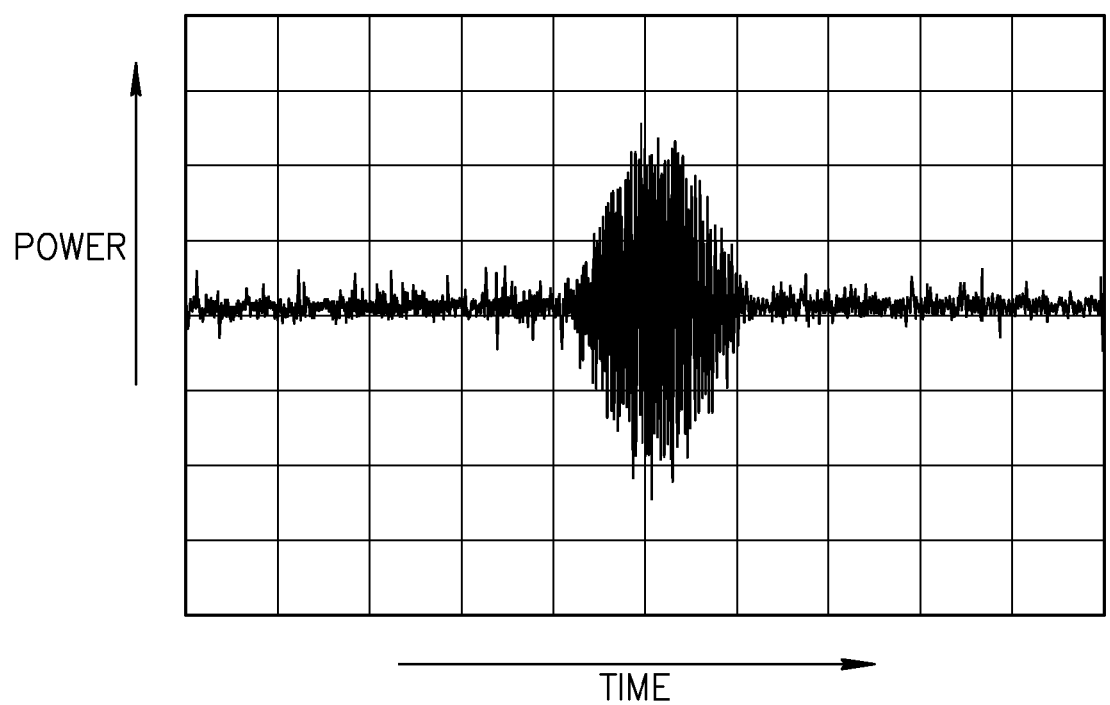
FIG. 7 is a graph illustrating the autocorrelation of the SAW correlator device of the present invention.

The time representation of the frequency response, represented by h(t), is used to calculate the autocorrelation function a(t) whereby a(t)=h(t)*h(−t), a convolution of h(t) with h(−t). A plot illustrating the autocorrelation of the SAW correlator device is shown in FIG. 7.

It is important to note that the present invention is not meant to be limited to the use of a BPSK SAW correlator. In general any type of pulse compressor may be used in the modem. More particularly, the invention may be performed using any suitable spread spectrum SAW technique such as BPSK, linear FM and non-linear FM.

In the case where the pulse compression used is linear FM, the signal can be expressed as follows in Equation 1.

$$V(t) = \sin[2\pi f(t)t] \quad (1)$$

where the frequency function f(t)=a·t is a linear rising function with time.

In the case where the pulse compression used is nonlinear FM, the signal can be expressed as in Equation 1 above where the frequency function $f(t)=a \cdot t^2$ is a non-linear rising function with time. Note that other functions of frequency are also suitable as well.

Figure 6:
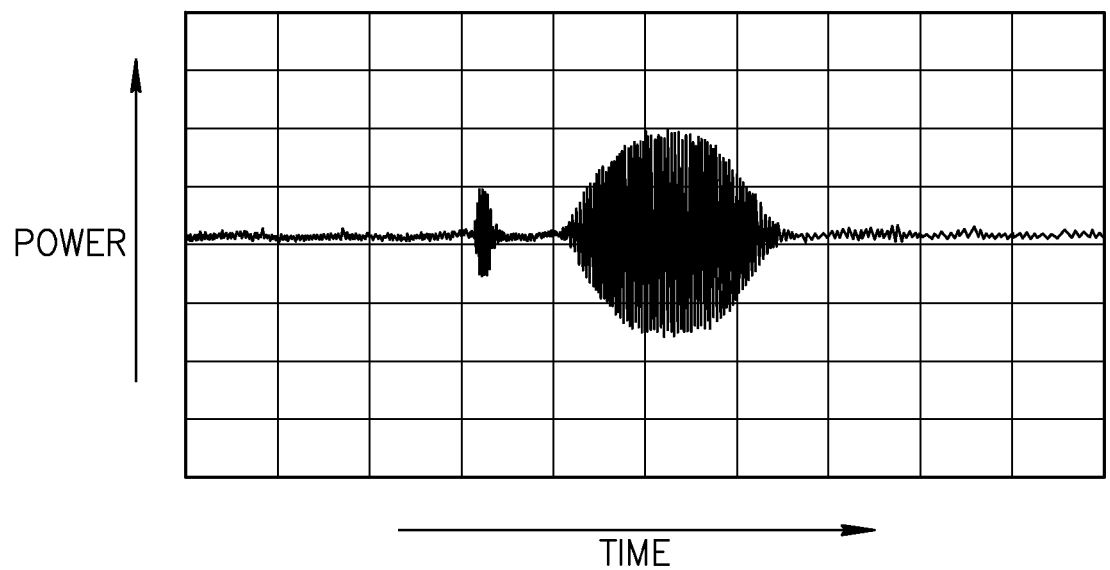
FIG. 6 is a graph illustrating the time domain impulse response of the correlator of the present invention.

A plot illustrating the time domain impulse response of the SAW correlator device is shown in FIG. 6. This plot illustrates the impulse response of the SAW correlator device that is generated in response to a short pulse interrogating the correlator, approximating a delta function. This is the transmit signal before it is upconverted to the RF band. As can be seen, the spread pulse generated by the correlator comprises smooth transitions. As is known in the electrical arts, the interdigital transducers are constructed such that spectral sidebands of spread pulse generated are significantly reduced.

The actual code used to configure the SAW correlator device is important to the operation of the system. The spreading code sequence is preferably chosen, however, so as to maximize one or more desirable characteristics including, but not limited to, autocorrelation, noise immunity, transmit spectrum and low intersymbol interference (ISI).

Referring to FIG. 6, subsequent to the generation of the spreading pulse, the correlator generates an undesirable RF leakage pulse caused by RF coupling within the SAW device. In accordance with the present invention, a pulse gating circuit is used to eliminate the RF leakage pulse from the output of the correlator. The pulse gate circuit comprises switching means (i.e. RF switches, FET switches, etc.) placed before and after the SAW correlator. The controller is adapted to operate the switches in an inverse manner whereby when the first switch is open, the second is closed, and vice versa. Thus, in operation, the control opens the first switch and closes the second switch to allow the interrogating pulse to enter the correlator while preventing the RF leakage pulse from being output. After a certain time period, the first switch is closed and the second is opened, thus allowing the spread pulse to be output to the transmit circuitry.

Frequency Synthesizer

Figure 8:
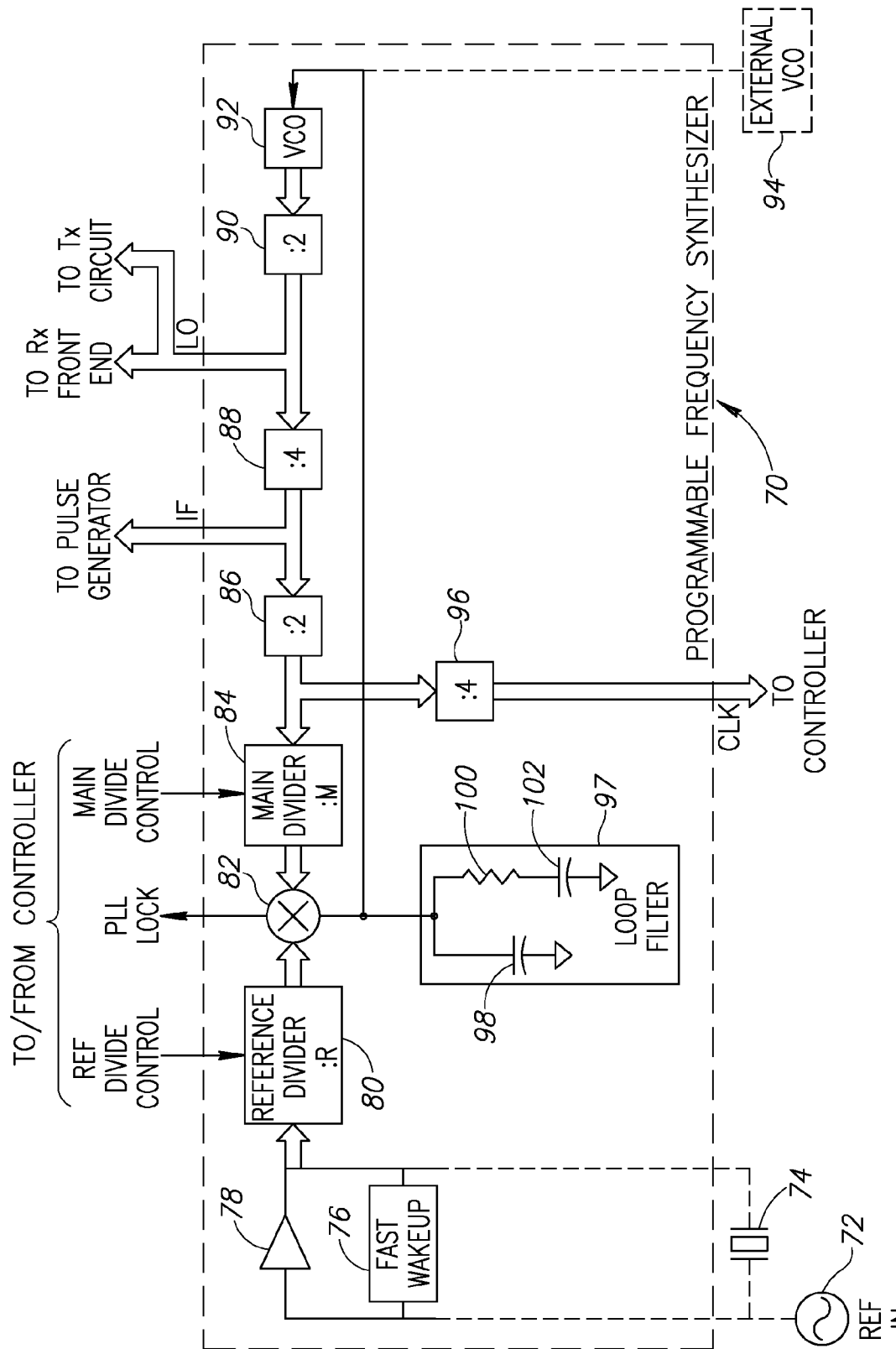
FIG. 8 is a block diagram illustrating the example frequency synthesizer of the present invention in more detail.

A block diagram illustrating the programmable frequency synthesizer circuit of the RF modem is shown in more detail in FIG. 8. The programmable frequency synthesizer functions as a phase lock loop (PLL) (1) to provide frequency agility to the modem thus enabling it to communicate over a plurality of a channels; (2) to provide the basic clock for the state machine in the controller, (3) as the signal source for the generation of an interrogation pulse to the SAW correlator, and (4) as the LO signal source for the transmit and receive front end up/down conversion circuitry.

The programmable frequency synthesizer, generally referenced 70, comprises a fast wakeup circuit 76, amplifier 78, reference frequency divider (R) 80, phase detector 82, main frequency divider (M) 84, voltage controlled oscillator (VCO) 92, loop filter 97 and frequency dividers 90, 88, 86, 96. The external frequency source 74 may comprise any suitable source such as a crystal oscillator, ceramic resonator, SAW resonator, external reference input 72, etc.

In the example provided herein, the frequency synthesizer uses a low frequency crystal oscillator for the reference clock 74. Any reference frequency may be used depending on the requirements of the particular implementation. In the example presented herein, a broad range of reference frequencies are supported: 6 MHz, 12 MHz, 24 MHz and 48 MHz. It is noted that these four frequencies are typical frequencies used in connection with universal Serial Bus (USB) integrated circuits (ICs). Typical USB chips utilize 6 MHz crystals and internally generate 24 or 48 MHz for clocking purposes. Thus, the example RF modem utilizing the example frequency synthesizer is particularly suitable for embedding in USB based systems. An advantage is that the USB and RF modem circuitry can use the same crystal as the frequency reference, thus reducing costs and aid in synchronizing the system since both the RF and baseband would operate using the same basic clock source.

Alternatively, the frequency synthesizer comprises means for generating its own reference frequency. The frequency synthesizer comprises a built-in on-chip oscillator coupled to an external crystal for generating the frequency source. Another alternative is to connect an appropriate digital signal to the frequency synthesizer for providing an external frequency source.

In the embodiment shown herein, a SAW based correlator is used having a central operating frequency of 488 MHz, bandwidth of 16 MHz and processing gain of 6 dB. Further, the example is adapted to operate in the 2.4 GHz ISM band. The ISM band is a frequency band that is a worldwide unlicensed band. The use of ISM band eliminates the need for obtaining special licenses to operate thus making it a compelling frequency choice for many wireless applications. The 2.4 GHz ISM band is open for unlicensed use in the frequency range of 2.400 to 2.4835 GHz yielding a total 83.5 MHz available bandwidth in which to communicate.

In order to generate frequencies that fall within and fully utilize the ISM band, a table of frequencies is defined that the frequency synthesizer needs to generate. Table 1 listing the frequencies (in MHz) used in each of the nine frequency channels generated by the frequency synthesizer and available in the example RF modem of the present invention is shown in FIG. 9. In the example provided herein, a total of nine channels are established wherein for each channel, the LO frequencies, IF interrogating pulse frequencies, RF (i.e. LO+correlator) frequencies, values of divider M and state machine clock frequencies are listed, all in MHz.

Thus, for every frequency channel the LO, LO/4, divider M and LO/32 signals are used. The LO signal is used in the transmitter upconverter and the receiver downconverter. The LO/4 signal is used to generate the interrogating pulse for the correlator. The output of the main divider M is compared with the output of the reference divider R. Both the reference (R) and main divider (M) are configured to output 1 MHz signals which are input to the phase comparator 82 (FIG. 8). The LO/32 signal is used for the clock that is fed to the state machine of the RF modem. The output RF frequency is the sum of the LO and the central frequency of the correlator which in this example is 488 MHz.

Figure 10:
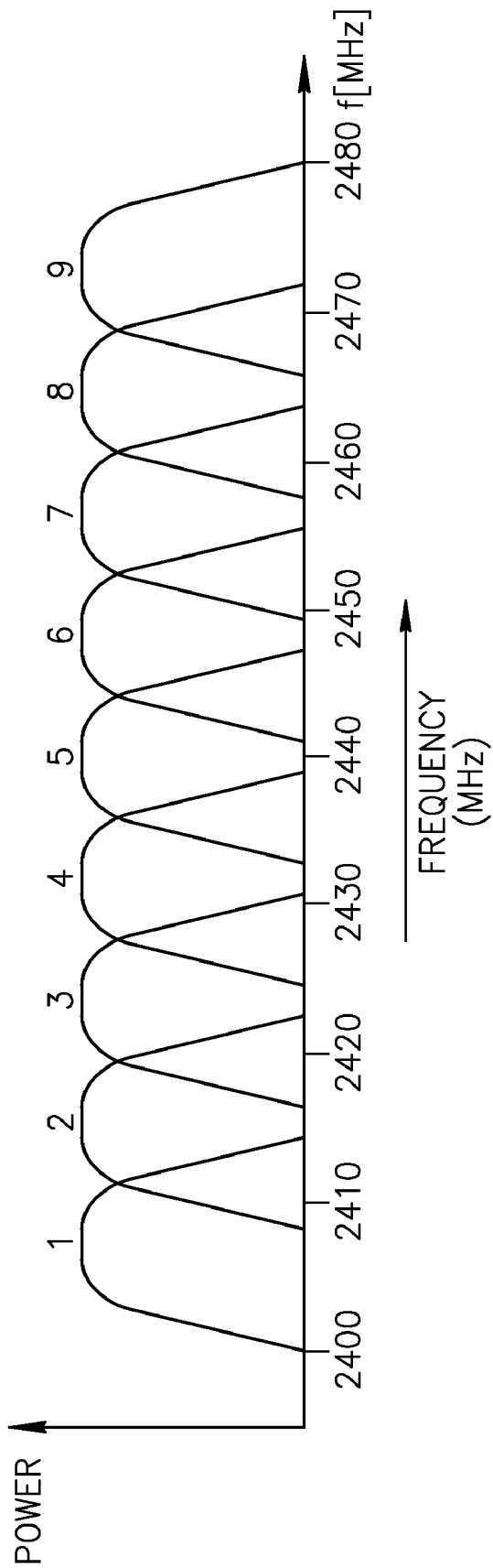
FIG. 10 is a diagram illustrating the spectral imaging of the nine frequency channels of the present invention.

A diagram illustrating the spectral imaging of all available channels in the system is shown in FIG. 10. The frequency spectrums for each of the nine channels have some overlap. The center frequencies of each of the nine channels are separated 8 MHz from each other.

Figure 11:
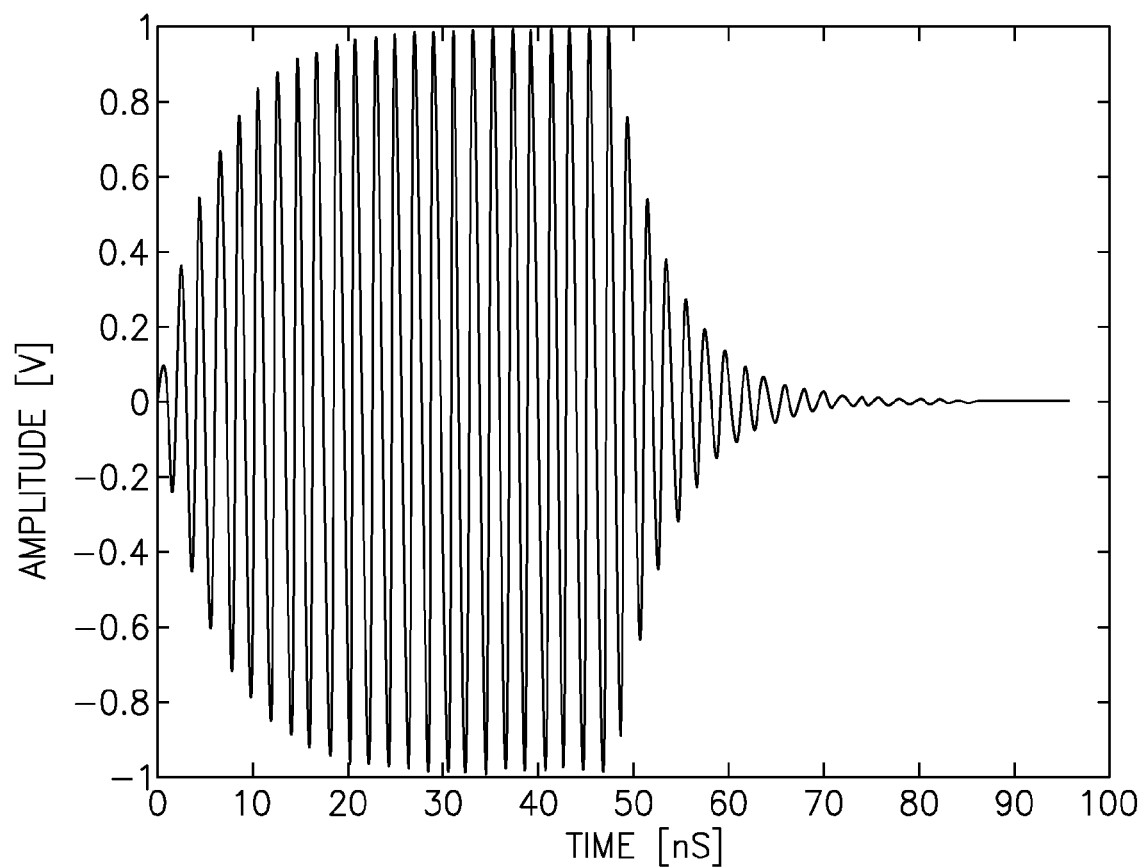
FIG. 11 is a graph illustrating the time domain representation of the interrogating signal pulse.

A graph illustrating the time domain representation of the interrogating signal pulse is shown in FIG. 11. Considering the desired spectral image to be generated and the correlator as described supra, the interrogating pulse input to the correlator has the following characteristics:
  rise time of 16 ns;
  flat time of 32 ns;
  fall time of 16 ns;
  central frequency in the range 480 MHz to 496 MHz (see FIG. 9);

The total pulse length is approximately 48 ns. Such pulse characteristics in the time domain represent a pulse whose energy is spread across 40 MHz in the frequency domain. Therefore, the interrogating pulse essentially has a bandwidth of 40 MHz.

Since the bandwidth of the pulse is 40 MHz, it can easily interrogate the correlator, even though its central operating frequency is changing across 16 MHz. As long as the central frequency of the pulse is between 480 MHz and 496 MHz, most of the energy in the pulse will fall within the correlator bandwidth. Thus, the pulse can efficiently interrogate the correlator even though its central frequency of operation changes.

Note that the correlator is operative to sufficiently respond to interrogating pulses in the entire band of 480 MHz to 496 MHz, and not only to the central frequency of 488 MHz. This is possible given that the correlator is (1) wide band and (2) the interrogating pulse is of relatively short duration (i.e. in time) and thus very wide band (i.e. in frequency). Since both the correlator and the interrogating pulse are wide band signals, they overlap extensively even though their frequencies shift one against the other.

The RF signal is generated to have a frequency LO+488 MHz. The LO portion of the RF signal is provided by the frequency synthesizer. The 488 MHz portion is provided by the correlator. Even though the central frequency of the interrogating pulse changes across a range of 16 MHz, the resulting spread signal from the correlator will always be centered around 488 MHz.

The VCO 92 (FIG. 8) can be implemented using any suitable implementation and is well known in the art. In the example provided herein, the VCO comprises an on-chip inductor and varactor combination as the tuning element. The VCO is constructed as a double-balanced NPN oscillator. This implementation has the advantages of (1) very high Q factor for the VCO and hence very good phase noise (on-chip inductors and capacitors typically present better Q factors than discrete components; (2) minimizing interferences from parasitics from stray inductance and capacitance; (3) very small outline achieved (e.g., total silicon area is approximately $0.1\ mm^2$); (4) low cost implementation; and (5) ease of tuning and control.

In this example, the VCO is adapted to operate in the central frequency of 3.9 GHz. Appling the appropriate tuning voltage permits it to operate in the frequency range of −100 to +100 MHz, thus permitting the VCO to oscillate in the 3.8 GHz to 4 GHz. A suitable value for the inductor is L=1.7 nH and for the capacitance C=1 pF±100 fF.

Note that the frequency of 3.9 GHz was selected for the following reasons: (1) the relatively high frequency of 3.9 GHz permitted the use of small values for L and C, thus minimizing the size of the on-chip tank circuit; (2) the 3.9 GHz frequency dictates taking the LO frequency signal after the first frequency divider 90 (FIG. 1), thus the output of this divider immediately provides the I and Q components of the LO which aid in implementing the image-rejection mixers without the need to use poly-phase filters. This permits the implementation of image-rejection without the need to generate the 90 degree shift since it is generated from the first divider 90 (FIG. 1).

The phase detector 82 and the dividers 80, 84, 86, 88, 90, 96 are implemented using an appropriate technology for the particular application, including digital, analog, discrete, CMOS, ECL, etc. The frequency dividers in the example presented are implemented using D type flip flops. The phase detector can be a simple XOR gate while the loop filter can be implemented either on-chip or off-chip. In this example, the loop filter 97 comprises capacitors 98, 102 and resistor 100 configured as a double pole low pass filter. Depending on the component values required, it may be desirable to implement the loop filter externally.

As stated supra, the frequency synthesizer can operate with a low frequency crystal oscillator as its reference clock. The VCO, phase detector and frequency dividers in combination enable the generation of a higher frequency that is an integer multiple of the reference clock. The VCO operating frequency can be controlled by suitably programming the dividing ratio of the frequency dividers.

The reference divider value R can be configured to be 6, 12, 24 or 48. As an example consider a crystal oscillator reference frequency of 6 MHz. These crystals are readily available commercially and are inexpensive. In this case R is set to 6 thus providing a 1 MHz reference signal at one input of the phase comparator. Setting the frequency dividers to a combined ratio of 3904 results in the VCO oscillating at a frequency of 3904 MHz and yields a 1 MHz signal input to the phase comparator from the main divider M.

The LO and other signals used in the modem are obtained from the divider taps. In this example, the LO for the TX and RF front end circuits is the output of the divide by 2 divider 90, i.e. 3904/2=1952 MHz. The IF interrogating pulse to the SAW correlator is the output of the divide by 4 divider 88, i.e. 1952/4=488 MHz. The frequency synthesizer clock used by the state machine in the controller is the output of the divide by 4 divider 96, i.e. 61 MHz (LO/32). The RF frequency (i.e. combined LO and correlator) in this case is 1952+488=2440 MHz. The dividing ratio for the main and reference dividers is set by the MAIN DIVIDER CONTROL and REF DIVIDER CONTROL signals, respectively, that are output by the controller. Thus, by programming the frequency synthesizer with the appropriate dividing ratios, the frequency of operation can be easily changed, thus providing multiple channels of communication.

TX Circuit

With reference to FIG. 1, the output of the matching network 26 is input to a TX/RX switch 28 which is controlled by a TX/RX control signal generated by the host or other control/configuration means. When the switch is in the TX state, the output of the impedance matching network is input to the TX circuit 30.

Figure 12:
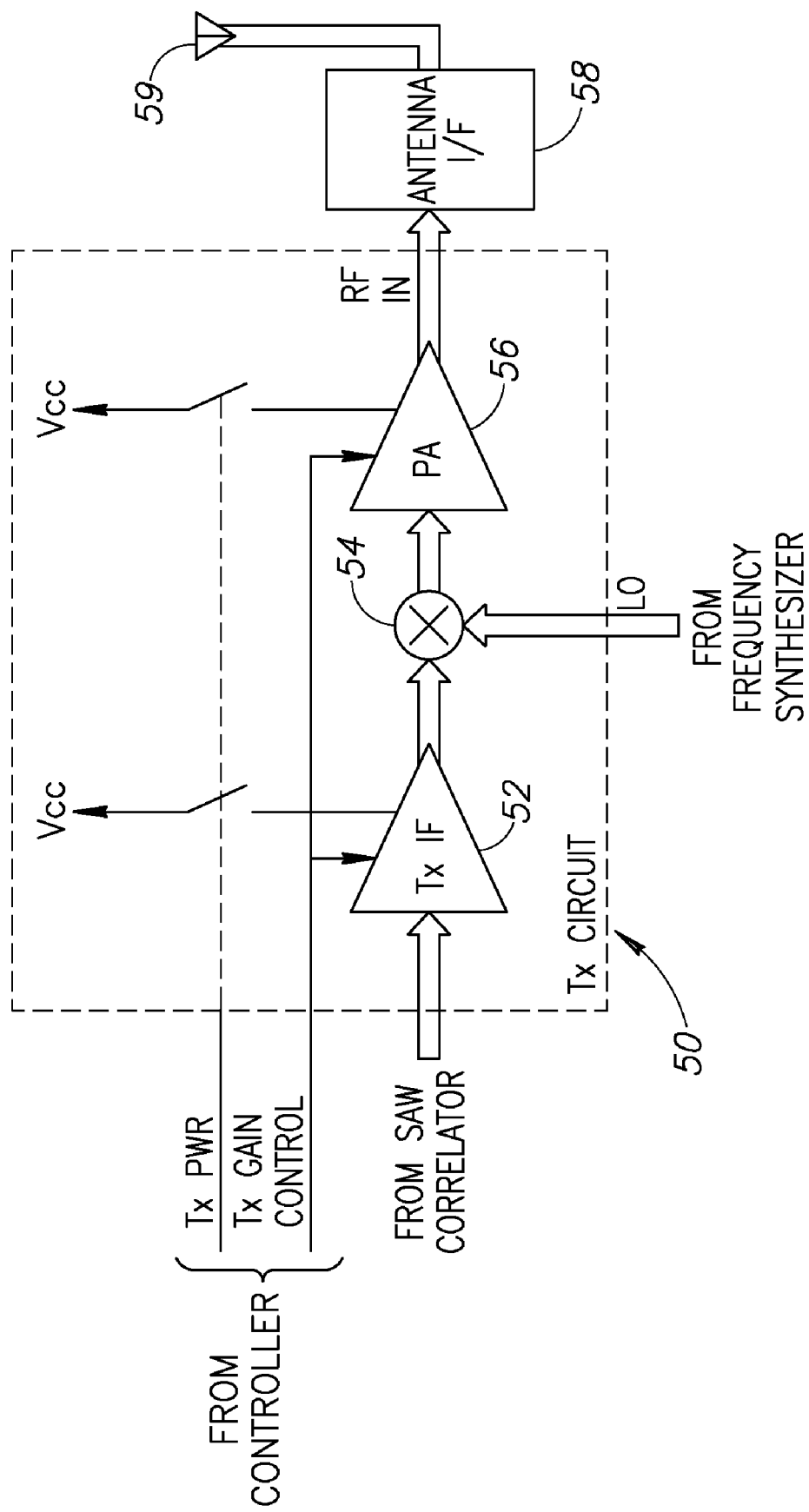
FIG. 12 is a block diagram illustrating the TX circuit of the RF modem in more detail.

A block diagram illustrating the TX circuit of the RF modem in more detail is shown in FIG. 12. The TX circuit, generally referenced 30, is operative to provide the upconversion prior to the final stage of amplification and feeding to the antenna. The circuit comprises an IF amplifier 52 having a differential input, differential mixer 54 and a differential RF power amplifier 56 having differential output. The $V_{CC}$ supply to the amplifiers is controlled via switches 53, 55 according to the Tx_PWR signal from the controller. In addition, the gain of the amplifiers is set by the Tx_GAIN_CONTROL signal provided by the controller.

Figure 13:
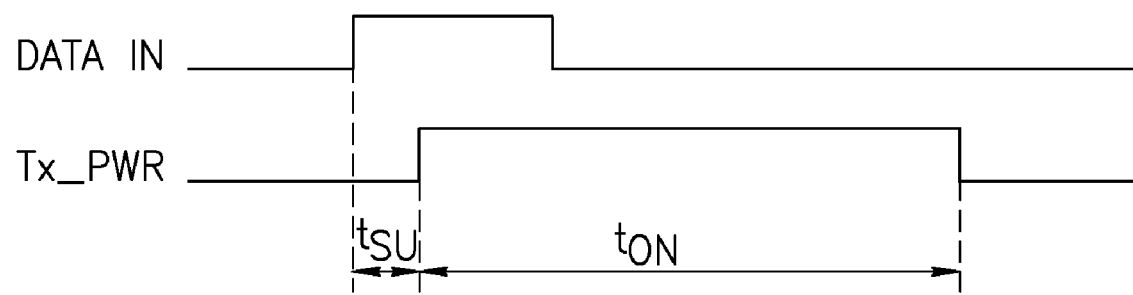
FIG. 13 is a diagram illustrating waveform traces of signals of the TX circuit.

The input to the IF amplifier is the spreading pulse output from the correlator at the IF frequency (e.g., 488 MHz). The mixer is operative to multiply the IF IN signal output of the SAW correlator with the LO signal from the frequency synthesizer, resulting in an upconverted RF OUT signal. In this example, the mixer upconverts the signal to the desired frequency band, such as the 2.4 GHz ISM band using an LO signal having one of the LO frequencies listed in FIG. 9. Preferably, an image rejection mixer is used having at least 30 dB rejection. The signals of the TX circuit have waveforms as shown in FIG. 13.

The output amplifier 56 is operative to have a gain of approximately 40 dB. This level of gain is necessary in order to amplify the attenuated output of the SAW correlator, e.g., −30 to −20 dBm, to a level of approximately 15 dBm. The input impedance of the amplifier is preferably 50 Ohms. Note that in one embodiment, amplifying the signal twice, i.e., 10 dB using a first amplifier located before the SAW and 30 dB using a second amplifier located after the SAW, is preferable rather than using a single amplifier with larger gain. Note that amplifiers having switching times on the order of 10 to 20 ns are sufficient.

Note that in an alternative embodiment, the modem can be constructed to have two or more modes of operation, e.g., a high data rate, low range mode and a low data rate high range mode. In the high data rate mode, the gain of the amplifiers are set to low gain thus utilizing the high linearity of the amplifier. In the low data rate, the gain of the amplifiers are set high thus reducing the linearity but increasing the effective range. The two gain states are determined by the Tx_GAIN_CONTROL signal from the controller.

In the low speed mode of operation, the correlator is interrogated with pulses that are spaced far enough apart such the pulses output from the correlator do not overlap each other. In other words, no Intersymbol Interference (ISI) is generated. As the interrogating pulses are spaced closer and closer together, the pulses output from the correlator begin to overlap each other thus creating ISI. Spacing the interrogating pulses closer together, however, permits higher data rates to be achieved.

A SAW based spread spectrum transceiver can handle these higher bit rates due to the fact the SAW correlator is linear. A linear SAW correlator performs the same de-spreading process even for the higher bit rates so long as the amplifiers before the correlator remain linear. Thus, to achieve high bit rates by intentionally creating ISI requires that very linear amplifiers be used in the receiver front end circuit. Note, however, that when operating at higher bit rates, i.e., from 3 to 8 Mbps, the transceiver is more susceptible to interference and channel impairments.

The controller is operative to generate the timing and control signals required by the TX circuit. The transmit control portion of the controller may be implemented as a state machine. In this case, the state machine is positive edge triggered thus starting a sequence of activating the amplifiers each time the data in line transitions from low to high.

The Tx_PWR signal is generated by the state machine in response to the data in line. A gating time delay of length $t_{SU}$ is imposed before the amplifiers are turned on. As described previously, pulse gating is used to prevent the RF leakage being output of the correlator. The amplifiers are maintained on for the duration of the spread pulse, i.e. approximately 800 ns.

Note that the functionality of the transmit state machine may be implemented using two one-shots in series. Both one-shots being retriggerable. The first one-shot having a duration equal to the pulse gating delay $t_{SU}$. The second one-shot having a time duration equal to the spread pulse width, approximately 800 ns.

The RF output of the power amplifier is input to an antenna interface 58 which functions to couple the antenna 59 to both the TX circuit and RX front end circuits. For example, the antenna interface may comprise any suitable RF switch. When in the TX state, the switch is operative to couple the output of the amplifier to the antenna. The antenna may comprise any suitable configuration including but not limited to printed dipole with balanced feed, printed sleeve dipole without unbalanced feed, printed monopole with unbalanced feed, monopole helical with unbalanced feed, printed notch with unbalanced feed, printed spiral with unbalanced feed, printed semi-loop, printed patch shorted to ground by vias or small loop.

RX Front End

Figure 14:
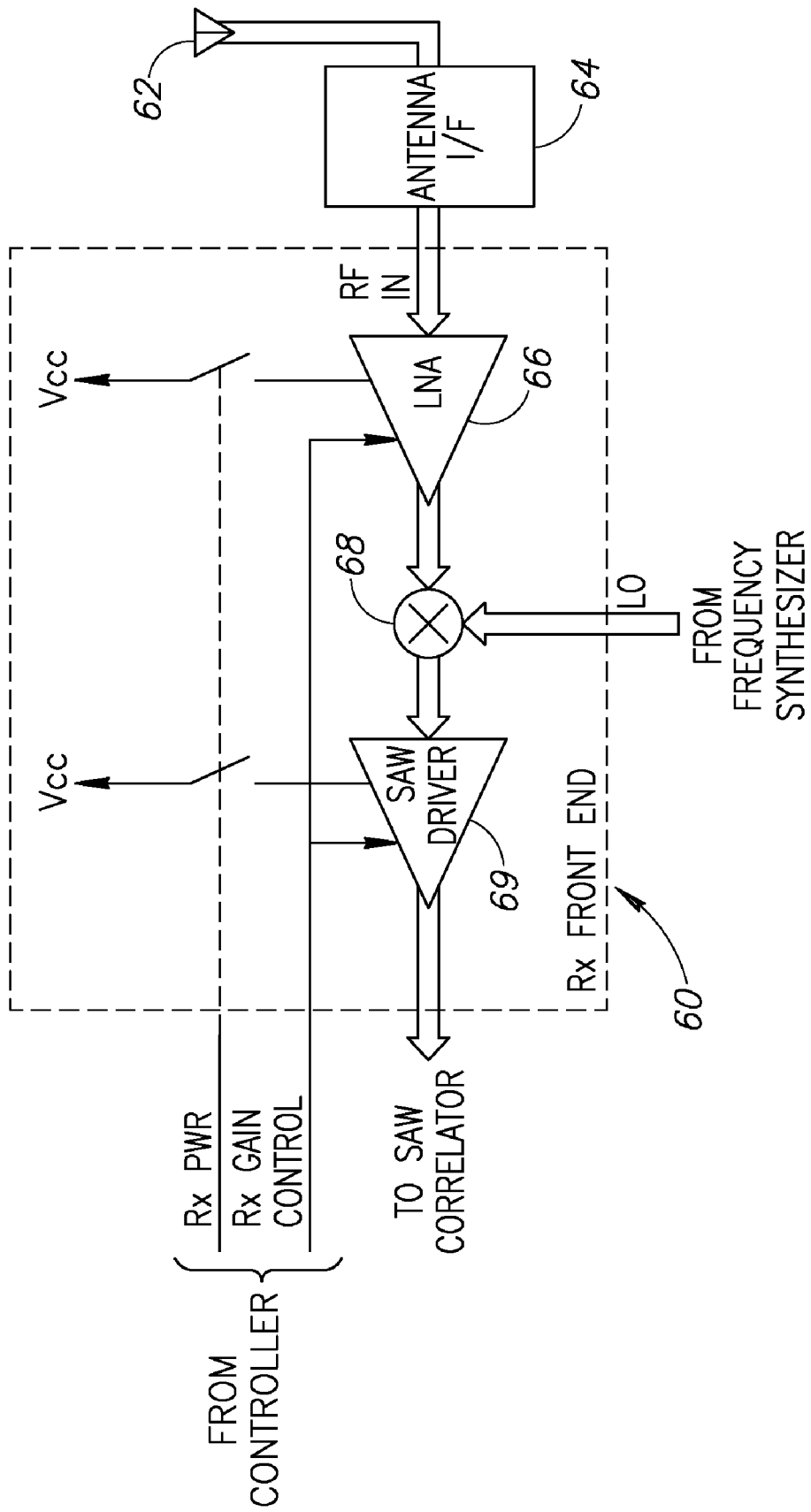
FIG. 14 is a block diagram illustrating the RX front end circuit of the RF modem in more detail.

A block diagram illustrating the RX front end circuit of the RF modem in more detail is shown in FIG. 14. The RX front end circuit, generally referenced 36, is a single stage down conversion circuit that comprises a differential low noise amplifier (LNA) 66, differential mixer 68 and differential SAW driver 69. In the receive path, the RF IN signal received from the antenna 62 is input to the RX front end circuit via the antenna interface 64. The output of the LNA is mixed with the LO signal from the frequency synthesizer via mixer 68 to generate the IF signal. The IF signal is then amplified by a second LNA (SAW driver) 69 before being output to the SAW correlator as IF OUT. The $V_{CC}$ supply to the LNAs is controlled by switches 63, 65 via the Rx_PWR signal from the controller.

Note that the RX front end circuit also may be constructed to have two modes of operation: a high bit rate, short range mode and a low bit rate, long range mode. The high bit rate mode assumes high carrier to noise ratio (CNR) and little channel multipath effects thus enabling high bit rate operation. The main concern in this mode is handling the effects of ISI. The low bit rate mode assumes low CNR and severe channel multipath and fading effects, thus requiring low bit rate operation. The main concern in this mode is handling weak receive signals and multipath effects.

Note that unlike typical prior art circuits, there is no need for a complex RF filter or even a simple LC between the antenna and the LNA, thus allowing for a wide dynamic range of transmitting and receiving signals. This requires the RX front end to have a very high dynamic range.

The output of the RX front end is input to the SAW correlator which functions not only as a correlator but also as a sharp filter, rejecting out of band signals. Further, the LNA 66 preferably has high gain since the SAW device is a lossy component.

The signal output of the RX front end circuit is input to the SAW correlator via matching network 26 (FIG. 1). The correlator functions to de-spread the received signal from the original code sequence to a relatively narrow pulse, e.g., from a wide pulse of 650 ns to a pulse having a width of approximately 50 ns. The output of the SAW correlator is input to the receive circuit via matching network 42.

Receiver Circuit

Figure 15:
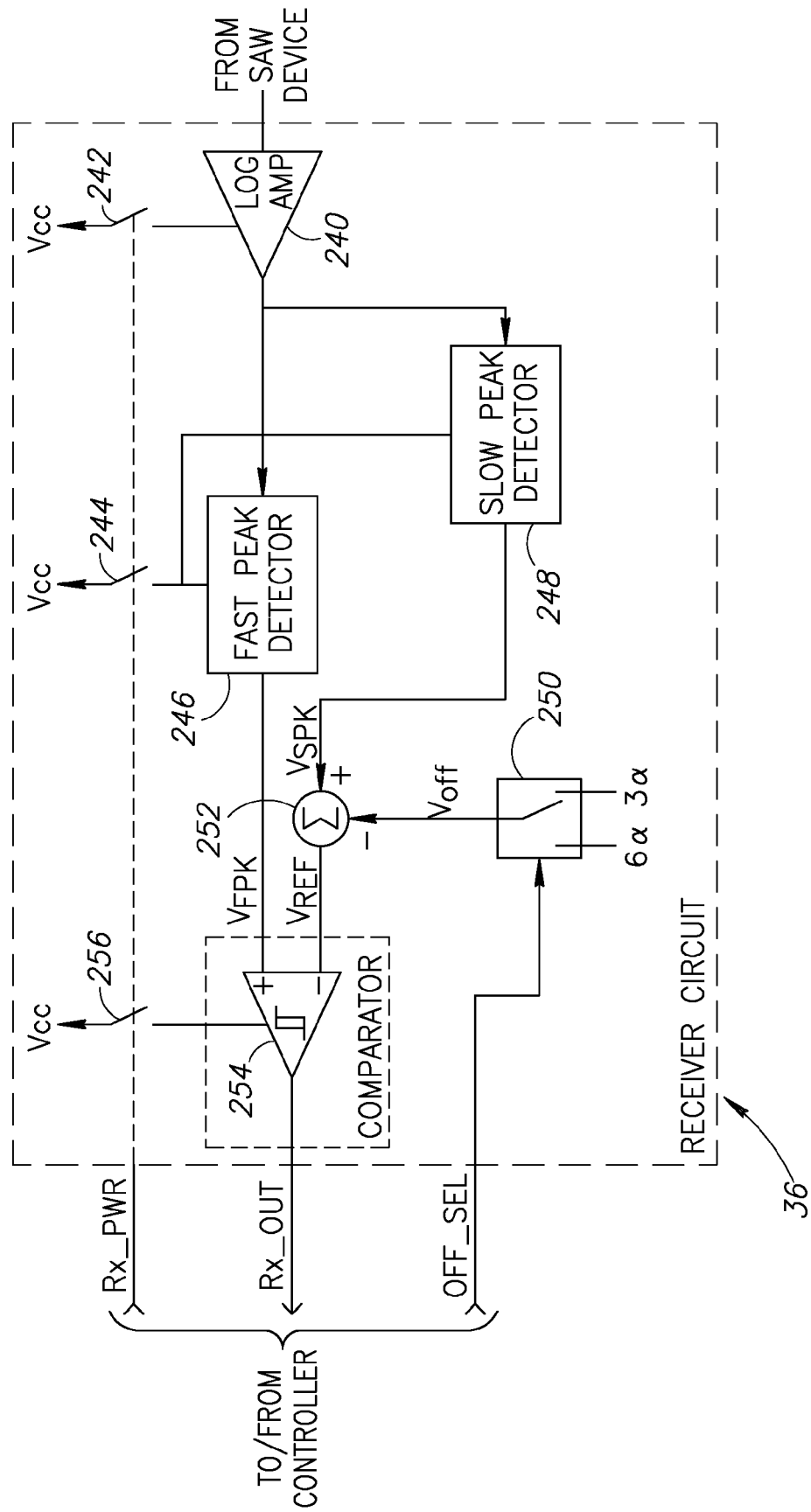
FIG. 15 is a block diagram illustrating the receive circuit of the RF modem in more detail including the peak detector and decision circuits.

A block diagram illustrating the receiver circuit of the RF modem in more detail including the peak detector and decision circuits is shown in FIG. 15. In operation, the output of the SAW correlator is input to the receiver circuitry. The receiver circuitry, generally referenced 36, comprises logarithmic amplifier (log amp) 240, fast peak detector 246, slow peak detector 248 and a decision circuit or comparator 254.

Note that the log amp is optional, depending on the level of signal the peak detectors can detect with a reasonable level of noise immunity. The function of the log amp is to compensate for the losses of the SAW correlator. The autocorrelation results from the SAW are input to the log amp. Note that in accordance with the present invention, the SAW device performs a dual role of integrating the energy of the received spread signal while filtering (i.e. rejecting) all other signals.

The output of the correlator is processed by the receiver circuit to determine whether a pulse is present or not. The log amp preferably has high linearity and high dynamic range since the ASK modulation used is amplitude sensitive.

The peak detectors follow the log amp and function to detect the envelope of the signal converting the RF signal to baseband. Preferably, the peak detectors are constructed to have a high dynamic range to match the input signal. In accordance with the invention, two peak detectors are used in parallel: a fast peak detector 246 and a slow peak detector 248. The difference between the two is their output bandwidth. The fast peak detector preferably has a bandwidth of 10 MHz (depending on the desired data rate) and the slow peak detector has a bandwidth that is set by a user via an external capacitor/resistor. In addition, a logarithmic peak detector is used in order to provide high dynamic range.

Both peak detectors are constructed using techniques well known to those skilled in the electrical arts. The fast peak detector functions to track the peak of the input signal using relatively little averaging. On the other hand, the slow peak detector is adapted to average the input signal so as to generate a slowly varying reference signal.

The decision stage is the final stage in the receive path. The output of this stage is a digital pulse that indicates whether a valid signal has been detected or not. It comprises a comparator 254 whose output RX_OUT is input to the controller. The comparator may be implemented using any suitable technique and in the example presented herein comprises a Schmitt trigger comparator device. The controller implements a state machine that functions to generate the data out line to the host.

The output of the fast peak detector circuit is input to the non-inverting input of the Schmitt trigger comparator while the reference signal output of the slow peak detector circuit is input to the inverting input of the comparator. The output of the comparator forms the RX_OUT signal which is input to the controller for processing and eventual output to the host for high layer processing, e.g., link or higher layer communications processing. The controller functions to make one or more decisions on the data in accordance with the desired modulation and communication scheme.

In accordance with the RF modem of the present invention, there is no requirement of a linear detector since all that is required is that the received pulse be detected. Thus, although a linear detector may be used, a non-linear detector enables the construction of a simpler, lower current consumption and less expensive peak detector. Depending on the application, the envelope of the received signal may be detected using either a linear or non-linear detector. The fast and slow detectors, in combination with the comparator, are operative to perform thresholding of the received signal and output digital binary data.

Note that the output of the comparator is a digital pulse that is processed by the host. The host can be configured (i.e., programmed) to implement numerous types of communication schemes, e.g., OOK, PWM, etc. Some examples of communication schemes are provided hereinbelow.

To provide two modes of operation, an offset voltage $V_{OFF}$ is subtracted from the output of the slow peak detector $V_{SPK}$. The signal $V_{SPK}$ is input to a summer 252 before being input to the inverting input of the comparator 254. The output of the fast peak detector $V_{FPK}$ is input to the non-inverting input of the comparator. An analog mux 250 selects which offset voltage to subtract from the slow peak detector voltage. For the high data rate mode, a threshold 3 dB below peak detection is used (i.e. 3α offset) and for the low data rate mode, a threshold 6 dB below peak detection is used (i.e. 6α offset), as expressed below in Equation 2.

$$\{\text{Mode 1}\}: V_{REF} = V_{SPK} - 3\alpha$$

$$\{\text{Mode 2}\}: V_{REF} = V_{SPK} - 6\alpha \qquad (2)$$

The OFF_SEL signal from the controller determines which of the two modes the receiver operates in. In addition, the Rx_PWR signal from the controller controls the supply $V_{CC}$ to the log amp, fast and slow peak detectors and to the comparator via switches 256, 244, 242.

General, Transmit and Receive State Machines

As described previously, the controller functions to perform all the timing, control and digital processing of the RF modem. It may be implemented in any suitable manner including, for example, as a state machine. The inputs to the state machine include Data In (RX_OUT), Mode, TX/RX, Shutdown, PLL LOCK and CLK. The outputs from the state machine include Data Out (TX_IN), Rx_PWR, Tx_PWR, OFF_SEL, Tx_GAIN_CONTROL, Rx_GAIN_CONTROL, REF DIVIDER CONTROL, MAIN DIVIDER CONTROL and PULSE LENGTH CONTROL.

Figure 16:
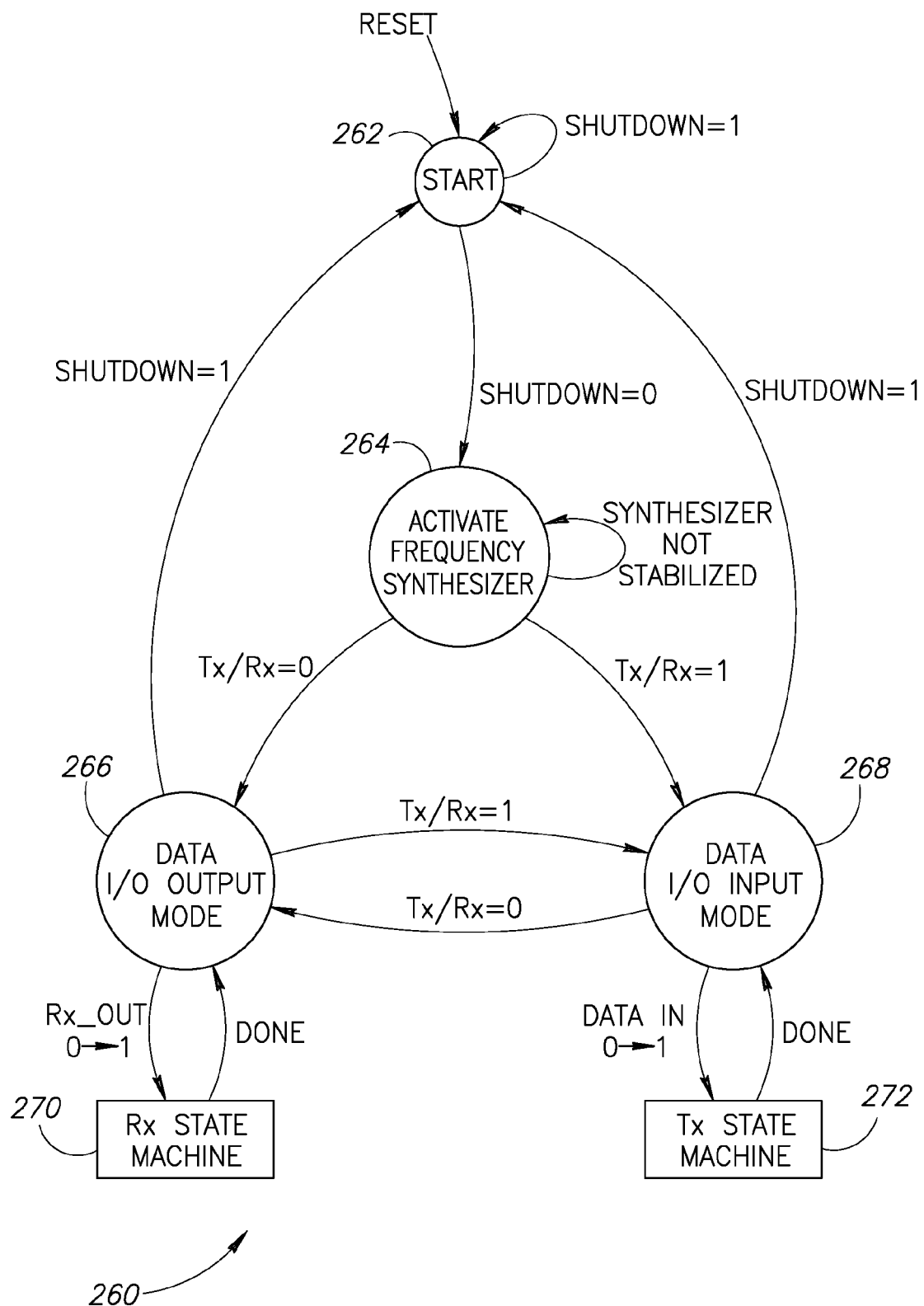
FIG. 16 is a state diagram illustrating the operation of the general state machine of the RF modem of the present invention.

A state diagram illustrating the operation of the general state machine of the RF modem of the present invention is shown in FIG. 16. The state machine, generally referenced 260, comprises the Start state 262 which is the initial state of the modem. This state is entered when the modem is powered (i.e. receiving $V_{CC}$) and Shutdown=1. In this state, the modem consumes very low current. Setting Shutdown=0 causes the modem to enter the Activate Synthesizer state 264. Setting Shutdown=1 again from any state causes the modem to move to return to the Start state.

The Activate Synthesizer state is the wake-up state wherein the synthesizer is given 60 microseconds to stabilize. The next state depends on the state of the TX/RX input control line. When the TX/RX input control line goes high, the Data I/O Input Mode state 268 is entered. In transmit mode (TX/RX=1) the SW_CONT, PULSE_OUT, Tx_PWR and Rx_PWR are all set to zero. When the Data In input line transitions from a low to a high (Data In=1), the Tx State Machine 272 is initiated.

Transitions between transmit and receive mode states 266, 268 are controlled by the state of the TX/RX line. Transitions from transmit and receive mode states to the start state is controlled by the Shutdown line.

Figure 17:
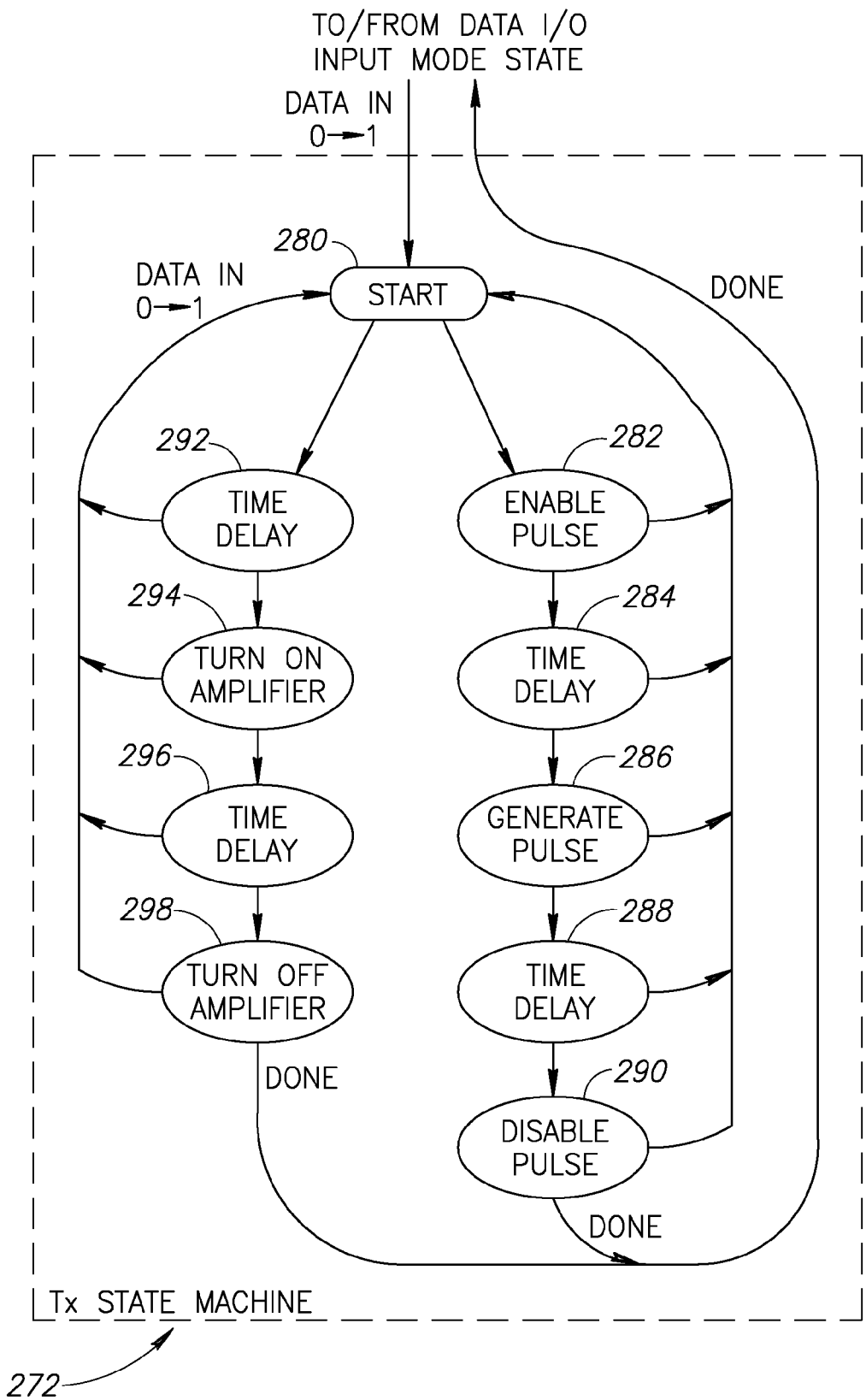
FIG. 17 is a state diagram illustrating the operation of the transmit state machine portion of the general state machine in more detail.

A state diagram illustrating the operation of the transmit state machine portion of the general state machine in more detail is shown in FIG. 17. Operation of the Tx state machine 272 begins with the Start state 280. From this state two operation paths are performed in parallel. One path generates the interrogating pulse and the other enables the transmitter RF front end circuit.

The interrogating pulse is generated first by entering the Enable Pulse state 282 wherein the SW_CONT signal is set high thus enabling the pulse shaping circuit 150 and the output amplifier 154 (FIG. 3). In the Time Delay state 284, a 50 to 150 ns time delay is then performed until stabilization is achieved. In the Generate Pulse state 286 state, the PULSE_OUT signal is set high which enables the interrogating pulse. The interrogating pulse is enabled for 56 cycles of the RF signal (i.e. approximately 115 ns) while in the Time Delay state 288. After the time delay, the signals are turned off in the Disable Pulse state 290. In particular, the PULSE_OUT signal is disabled (i.e. set low) and SW_CONT is set low.

Note that the generation of the interrogation pulse is non-retriggerable meaning that if a low to high transition of the Data In line occurs, it is ignored.

The amplifier is enabled by first entering the Time Delay state 292 which imposes a time delay before supply voltage is applied to the amplifiers in the transmit RF front end circuit, i.e. Tx_PWR is set high. The duration of the delay is approximately the delay of the SAW device minus the turn-on time of the power amplifier minus the duration of the interrogating pulse. In the next state 294, the amplifiers are turned on for a duration of approximately 800 ns (i.e. 390 cycles of the RF signal) imposed by the Time Delay state 296. In the next state 298, the amplifiers are shut off, i.e. Tx_PWR is set low.

Note that the circuitry that applies supply voltage to the transmit RF front end circuit is retriggerable meaning that if a low to high transition of the Data In line occurs, the 390 cycle time delay is restarted.

Referring to FIG. 16, when the TX/RX input control line goes low, the Data I/O Output Mode state 266 is entered. In receive mode (TX/RX=0) the SW_CONT, PULSE_OUT and Tx_PWR are all set to zero; Rx_PWR is set to one. When the output of the comparator in the decision circuit goes high (RX_OUT=1), the Rx State Machine 270 is initiated.

Figure 18:
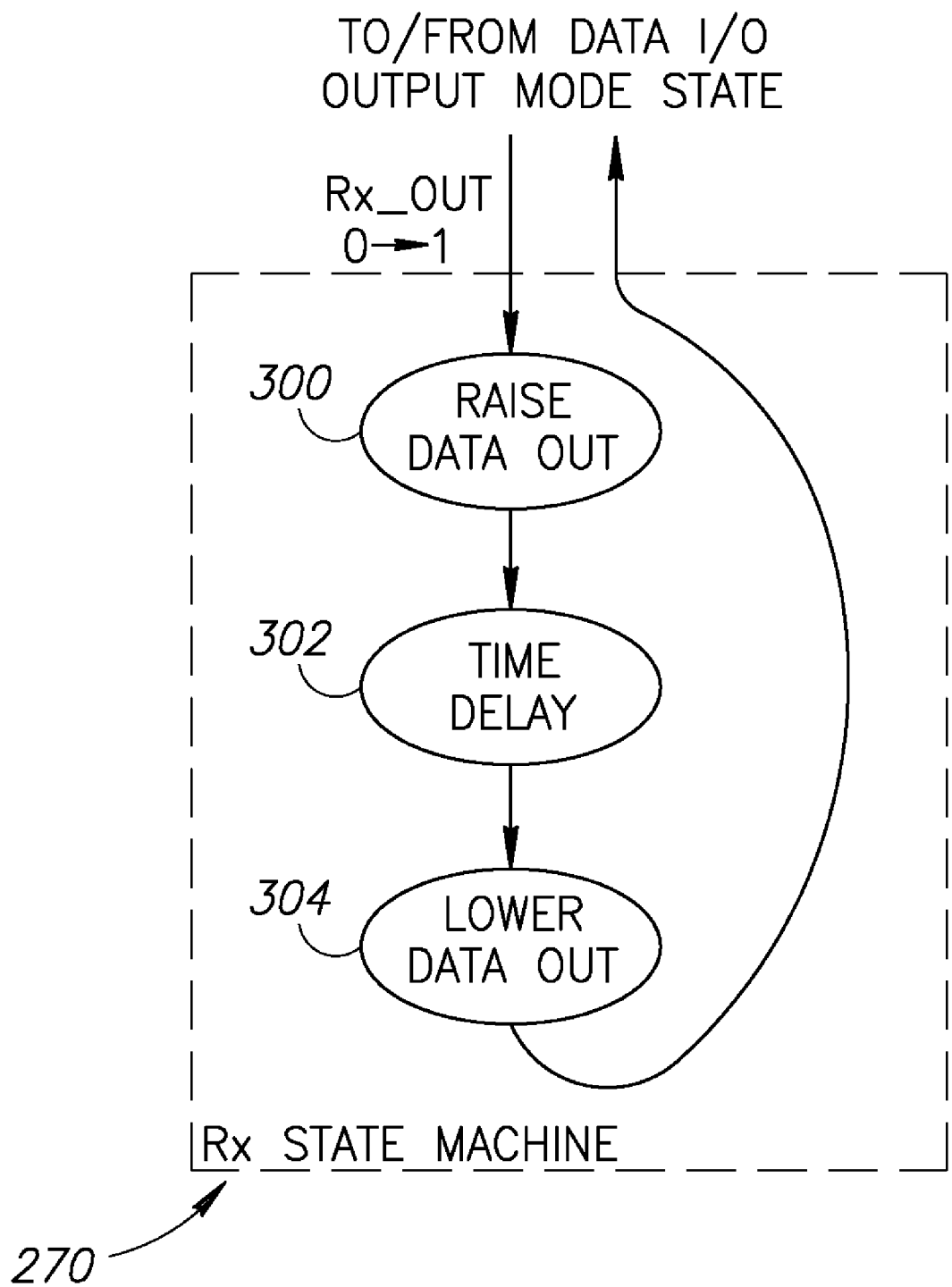
FIG. 18 is a state diagram illustrating the operation of the receive state machine portion of the general state machine in more detail.

A state diagram illustrating the operation of the receive state machine portion of the general state machine in more detail is shown in FIG. 18. Upon a transition of the output of the comparator from low to high, the Data Out line is set (state 300). After a time delay of approximately 100 ns (state 302), the Data Out line is lowered (state 304) and control returned to state 266.

Application of the Invention

As described previously, the RF modem is constructed generically as the basis for the physical layer for any number of modulation types and communication schemes. In particular, the RF modem is adapted to perform any type of digital pulse modulation. Three examples of digital pulse modulation will now be presented. The three modulation types include OOK, PWM and PPM modulations. Note that all of the following application examples may be constructed using any of the three RF modem embodiments described herein.

OOK Modulation

Figure 19:
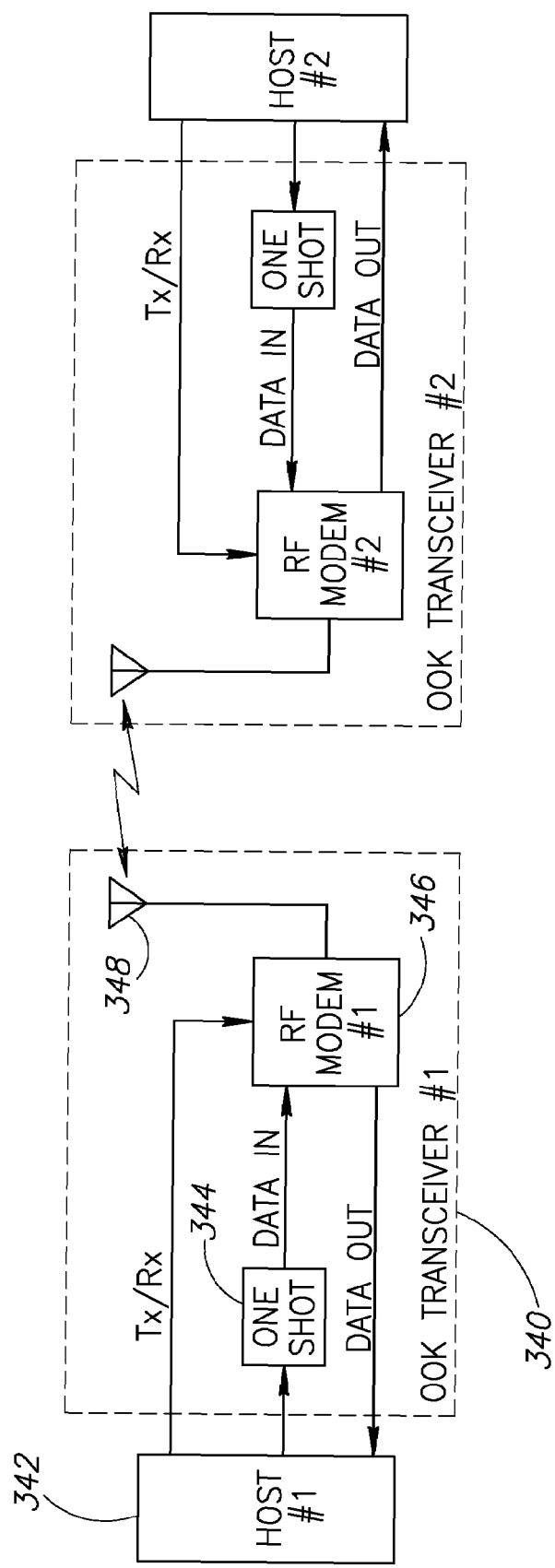
FIG. 19 is a block diagram illustrating an OOK communications system constructed using the RF modem of the present invention.

A block diagram illustrating an OOK communications system constructed using the RF modem of the present invention incorporating a programmable frequency synthesizer is shown in FIG. 19. The system comprises two OOK transceivers 340, labeled OOK transceiver #1 and #2 that are adapted to communicate half duplex using RF. OOK transceiver #1 comprises one shot 344, RF modem 346, labeled RF modem #1, and antenna 348. OOK transceiver #2 is similarly constructed and comprises a host #2, one shot device, RF modem #2 and an antenna. A first host 342, labeled host #1, is coupled to send data to and receive data from the OOK transceiver #1. A second host #2 is adapted to send data to and receive data from the OOK transceiver #2. Both hosts are adapted to drive the TX/RX control line to the modem.

In operation, the host transmits data by outputting the data to the RF modem #1. The data comprises a pulse to represent a '1', for example, and the absence of a pulse to represent a '0'. The RF modem is constructed in accordance with the present invention and is adapted to receive a pulse on the order of 50 ns. If the host cannot generate a pulse of such short width, a one shot device 344 can be used. The pulse is then spread, via the SAW correlator, to a spreading sequence as described above, and transmitted over the antenna 348.

The signal is received by the antenna of OOK transceiver #2 and input to the RF modem #2. The RF modem functions to de-spread the signal and output a 50 ns pulse to host #2 for further processing. If host #2 is not fast enough to input a 50 ns pulse, a second one shot or latch (not shown) can be used between the RF modem and the host.

PWM Modulation

Figure 20:
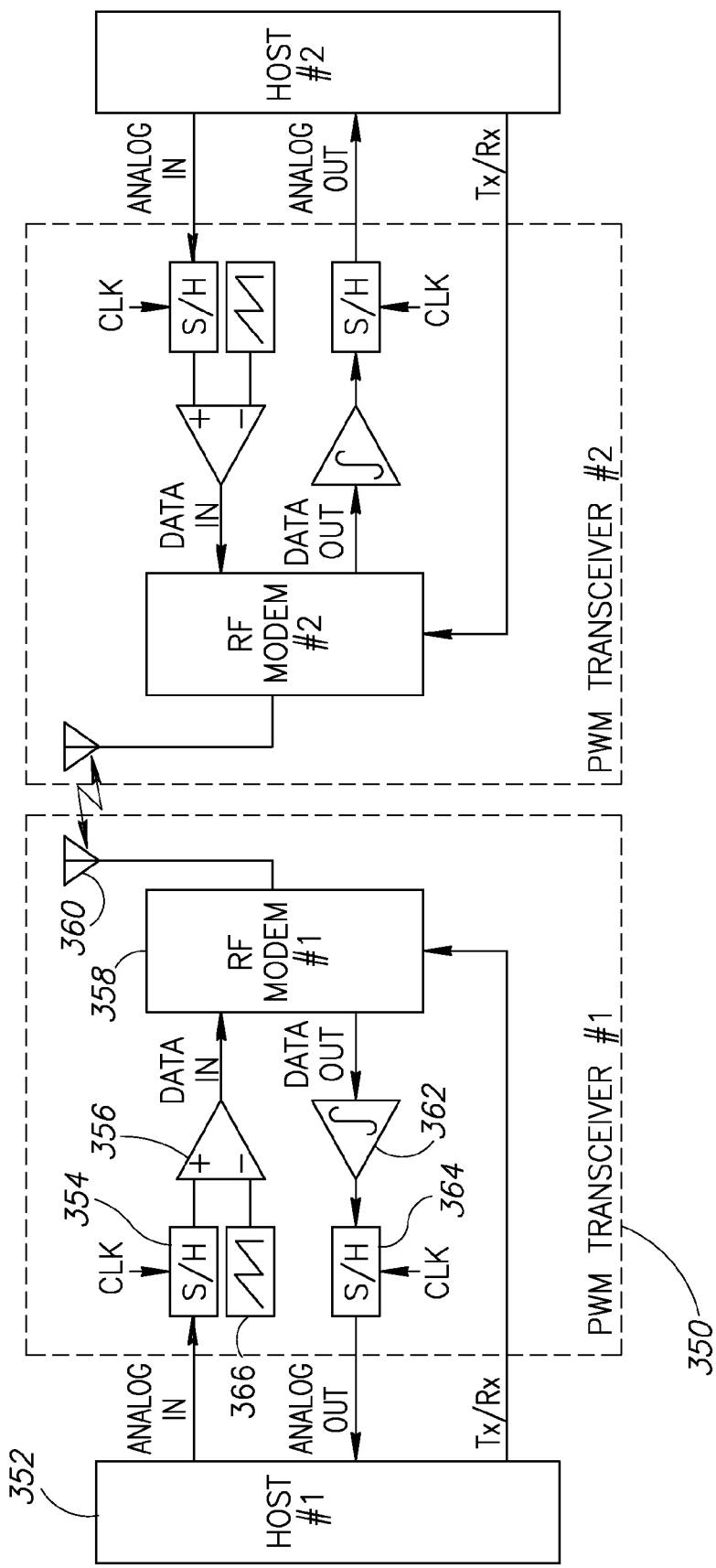
FIG. 20 is a block diagram illustrating a PWM communications system constructed using the RF modem of the present invention.

A block diagram illustrating a PWM communications system constructed using the RF modem of the present invention incorporating a programmable frequency synthesizer is shown in FIG. 20. The system comprises two PWM transceivers 350, labeled PWM transceiver #1 and #2 that are adapted to communicate half duplex using RF. PWM transceiver #1 comprises sample and hold (S/H) circuits 354, 364, saw tooth (ramp) signal generator 366, comparator 356, integrator 362, RF modem 358, labeled RF modem #1, and antenna 360. PWM transceiver #2 is similarly constructed and comprises S/H circuits, ramp function generator, comparator, RF modem #2, integrator and an antenna. A first host 352, labeled host #1, is coupled to send data to and receive data from the PWM transceiver #1. A second host #2 is adapted to send data to and receive data from the PWM transceiver #2. Both hosts are adapted to drive the TX/RX control line to the modem.

Figure 21:
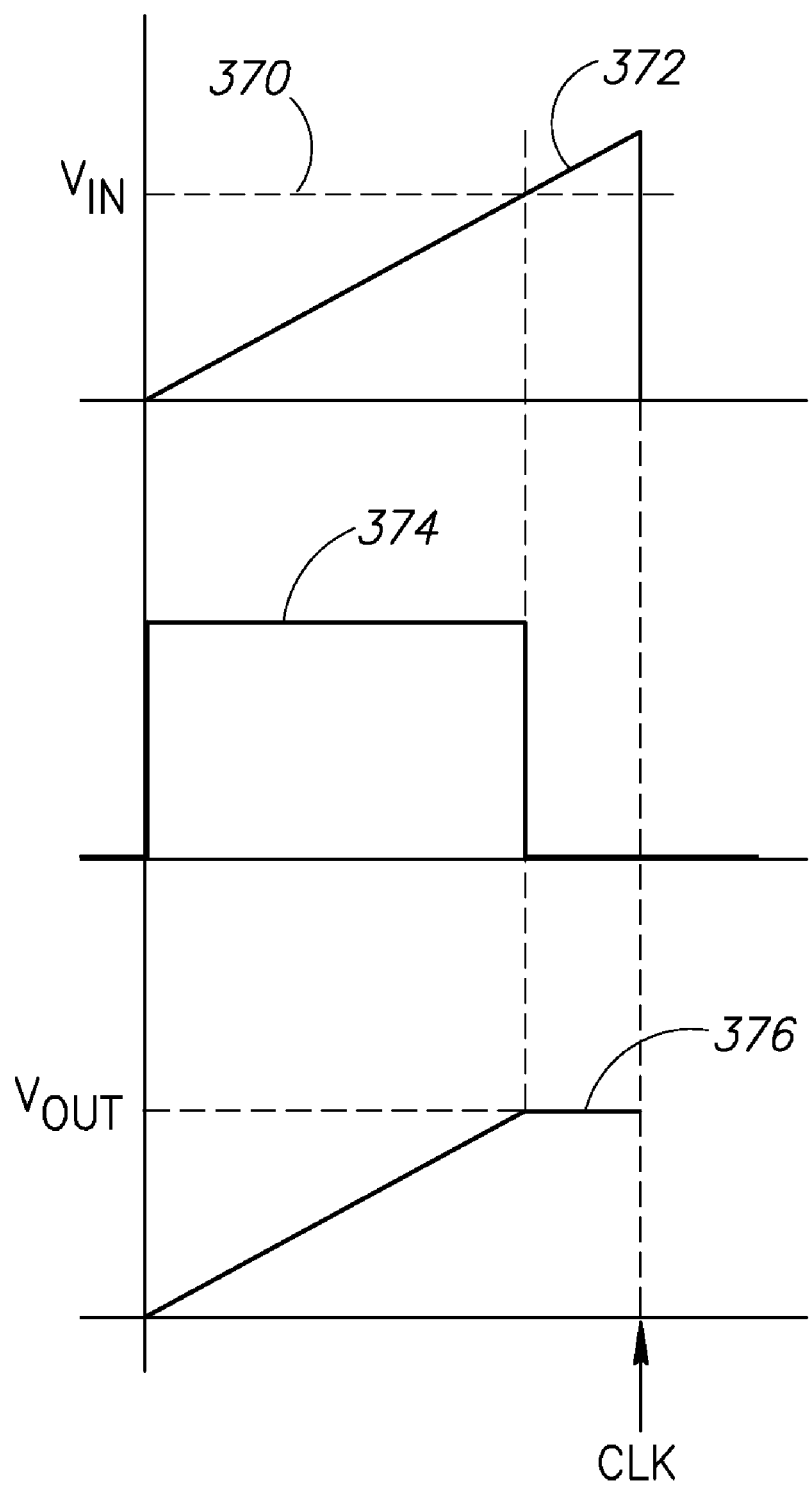
FIG. 21 is a diagram illustrating several signal waveforms of the PWM transceiver.

With reference to FIGS. 20 and 21, in operation, the host transmits data by outputting the signal Analog In to the S/H circuit 354. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 370 is sampled by the S/H circuit and input to the non-inverting input of comparator 356. The output 372 of the saw tooth or ramp function generator is input to the inverting input of the comparator. The period of the ramp function signal is preferably no wider than 150 ns to avoid problems associated with limitations of the Barker code. The output 374 of the comparator is high until the amplitude of the ramp exceeds the input signal at which point the output is brought low.

The Data In pulse is input to the RF modem and transmitted to PWM transceiver #2 via antenna 360. The pulse width of the transmit spreading waveform is varied in accordance with the pulse width of the input signal. For example, a 20 ns wide input pulse yields a receive signal whose peak pulse width is approximately 20 ns. A 100 ns wide input pulse yields a receive signal whose peak pulse width is approximately 100 ns. Note, however, that widening of the Barker code spreading sequence is limited. The increase in pulse width is limited to approximately 2 chips in duration (assuming a chip rate of 20 Mcps this corresponds to 150 ns).

The signal is received by the antenna of OOK transceiver #2 and input to the RF modem #2. The RF modem functions to de-spread the signal and output a pulse whose width is in accordance with the pulse width of the input signal. The output of the RF modem is input to an integrator 362 which functions to integrate the receive signal. The output signal $V_{OUT}$ 376 of the integrator is sampled by S/H 364. The output of the S/H circuit forms the Analog Out signal that is then input to the host or other means for further processing.

It is important to note that the ramp function generator and the clocks provided to the S/H circuits 354, 364 be synchronized such that a low to high transition of the ramp function corresponds with a symbol period of the data, i.e., Analog In signal, to be transmitted.

PPM Modulation

Figure 22:
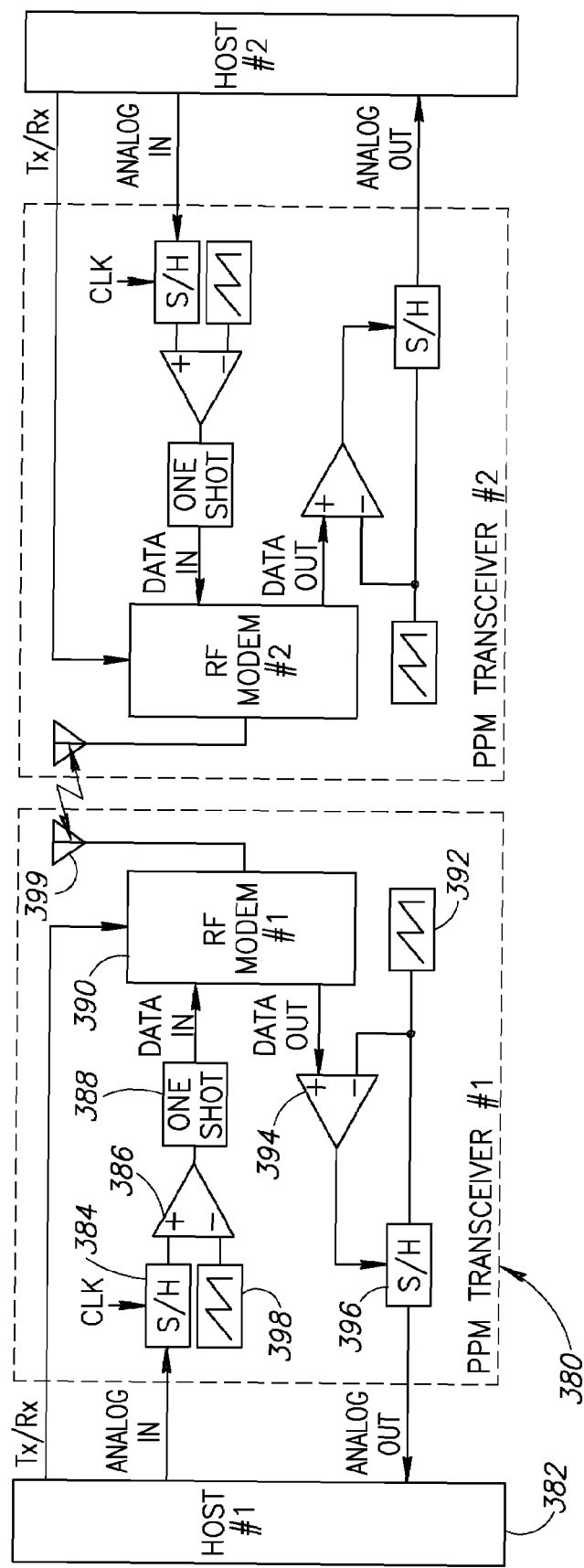
FIG. 22 is a block diagram illustrating a PPM communications system constructed using the RF modem of the present invention.

A block diagram illustrating an PPM communications system constructed using the RF modem of the present invention incorporating a programmable frequency synthesizer is shown in FIG. 22. The system comprises two PPM transceivers 380, labeled PPM transceiver #1 and #2, that are adapted to communicate half duplex using RF. PPM transceiver #1 comprises sample and hold (S/H) circuits 384, 396, saw tooth (ramp) signal generators 398, 392, comparators 386, 394, one shot 388, RF modem 390, labeled RF modem #1, and antenna 399. PPM transceiver #2 is similarly constructed and comprises S/H circuits, comparators, ramp function generators, one shot, RF modem #2 and an antenna. A first host 382, labeled host #1, is coupled to send data to and receive data from the PPM transceiver #1. A second host #2 is adapted to send data to and receive data from the PPM transceiver #2. Both hosts are adapted to drive the TX/RX control line to the modem.

Figure 23:
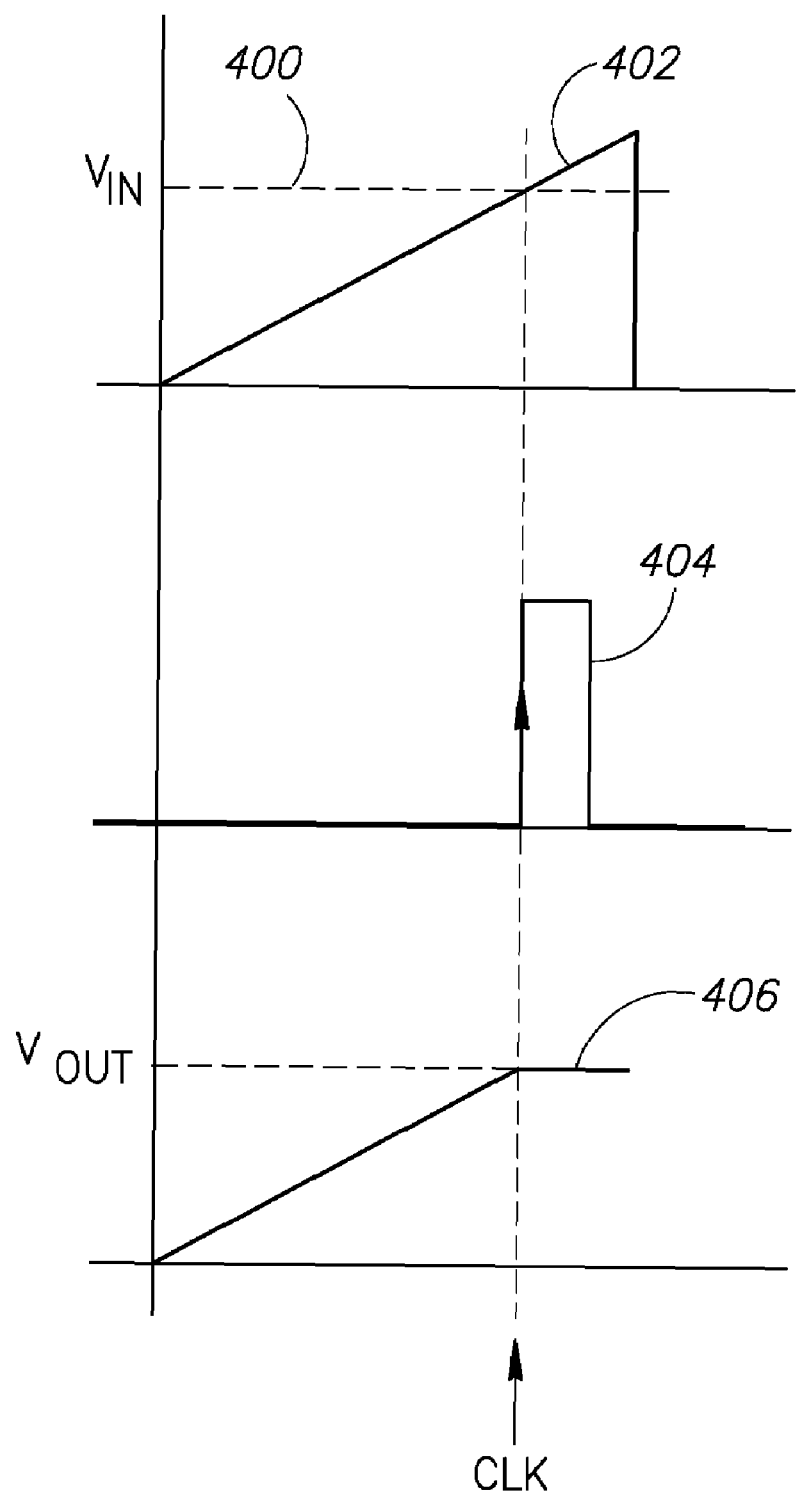
FIG. 23 is a diagram illustrating several signal waveforms of the PPM transceiver.

With reference to FIGS. 22 and 23, in operation, the host transmits data by outputting the signal Analog In to the S/H circuit 384. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 400 is sampled by the S/H circuit and input to the non-inverting input of comparator 386. The output 402 of the saw tooth or ramp function generator is input to the inverting input of the comparator. The output of the comparator is high until the amplitude of the ramp exceeds the input signal at which point the output is brought low. The output of the comparator is input to a one shot device 388 that is triggered by the falling edge of the output of the comparator. The one shot generates a pulse 404 uniform in width, e.g., 50 ns that is then input to the RF modem for transmission to PPM transceiver #2 via antenna 180.

The pulse position of the spreading waveform transmitted varies in accordance with the time position of the DATA IN signal. The signal is received by the antenna of OOK transceiver #2 and input to the RF modem #2. The RF modem functions to de-spread the signal and output a pulse whose position varies in accordance with the pulse position of the input signal. The output of the RF modem is input to comparator 394. The second input is the output of ramp function generator 392.

In operation, the output of the ramp signal is sampled by the S/H circuit 396 until the pulse arrives and is output by the RF modem as the Data Out signal. The output of the comparator forms the clock signal to the S/H circuit. The input to the S/H 396 increases until the output of the RF modem exceeds the ramp signal. This corresponds to the RF modem outputting a pulse at a point in time corresponding to the receiving of the pulse from the transmitter. At this point, the S/H is clocked and the signal $V_{OUT}$ 406 output of the S/H is set equal to its input. The output of the S/H circuit forms the Analog Out signal that is then input to the host or other means for further processing.

It is important to note that the ramp function generator 392 and the clock provided to S/H circuit 384 be synchronized such that a low to high transition of the ramp function corresponds with a symbol period of the data, i.e., Analog In signal, to be transmitted. Synchronization schemes are known in the art for synchronizing the ramp signal with the received signal such that data can be received.

In a PPM communication system, the critical performance indicator is the ratio β of symbol period to pulse width as given by Equation 3 below.

$$\beta = \frac{T}{\tau} \quad (3)$$

The signal to noise ratio (SNR) is given by Equation 4 below.

$$SNR = \frac{\frac{\beta^2}{3} \cdot \frac{E_b}{N_o}}{1 + \frac{2}{3}\beta^2(\beta-1)\sqrt{\frac{E_b}{N_o \pi}} e^{-\frac{E_b}{4N_o}}} \quad (4)$$

wherein $E_b$ is the energy per bit and $N_o$ is the noise level. If it is assumed that the link budget has a fixed energy per bit $E_b$, the performance is therefore dictated by the value of β. As the pulse width narrows, the SNR increases and vice versa. For example, if the pulse width τ used in transmission is approximately 50 ns, the symbol period T is 1000 ns, resulting in a β of 20, the $E_b$, equal to −70 dBm and the $N_o$ equal to −114+ 10*log(20)=−100 dBm, the SNR of the link is approximately 52 dB.

Second Embodiment RF Modem Using Multiple Correlators

To achieve higher communication bit rates, additional correlators and associated circuitry can be added to the first and second modem embodiments described above. In general, any number of correlators can be added wherein the correlator function or code of each correlator, represented by $f_i(t)$, is orthogonal with the functions of all other correlators. When the functions (i.e. codes) of each correlator are orthogonal to each other, each correlator transmits and receives independently of the other. A sufficient number of functions must be found, however, that satisfy the following criteria.

$$\langle f_i(t), f_j(t) \rangle = 0 \text{ for all } i \neq j \quad (5)$$

In other words, the cross correlation of all codes with each other must be very low, i.e. ~0. As an example, one skilled could easily generate multiple linear FM codes that are substantially orthogonal to each other and having cross correlations with each other of nearly zero.

To aid in understanding the principles of the present invention, an example modem is presented comprising N correlators. A modem incorporating a programmable frequency synthesizer can be constructed using any number N of correlators as long as the above-described criterion is met. The result of using multiple correlators is to increase the effective communication bit rate. Considering the RF modem of FIG. 1 having a bit rate of 8 Mbps as an example, the use of N correlators results in a total bit rate of N×8 Mbps.

Figure 24:
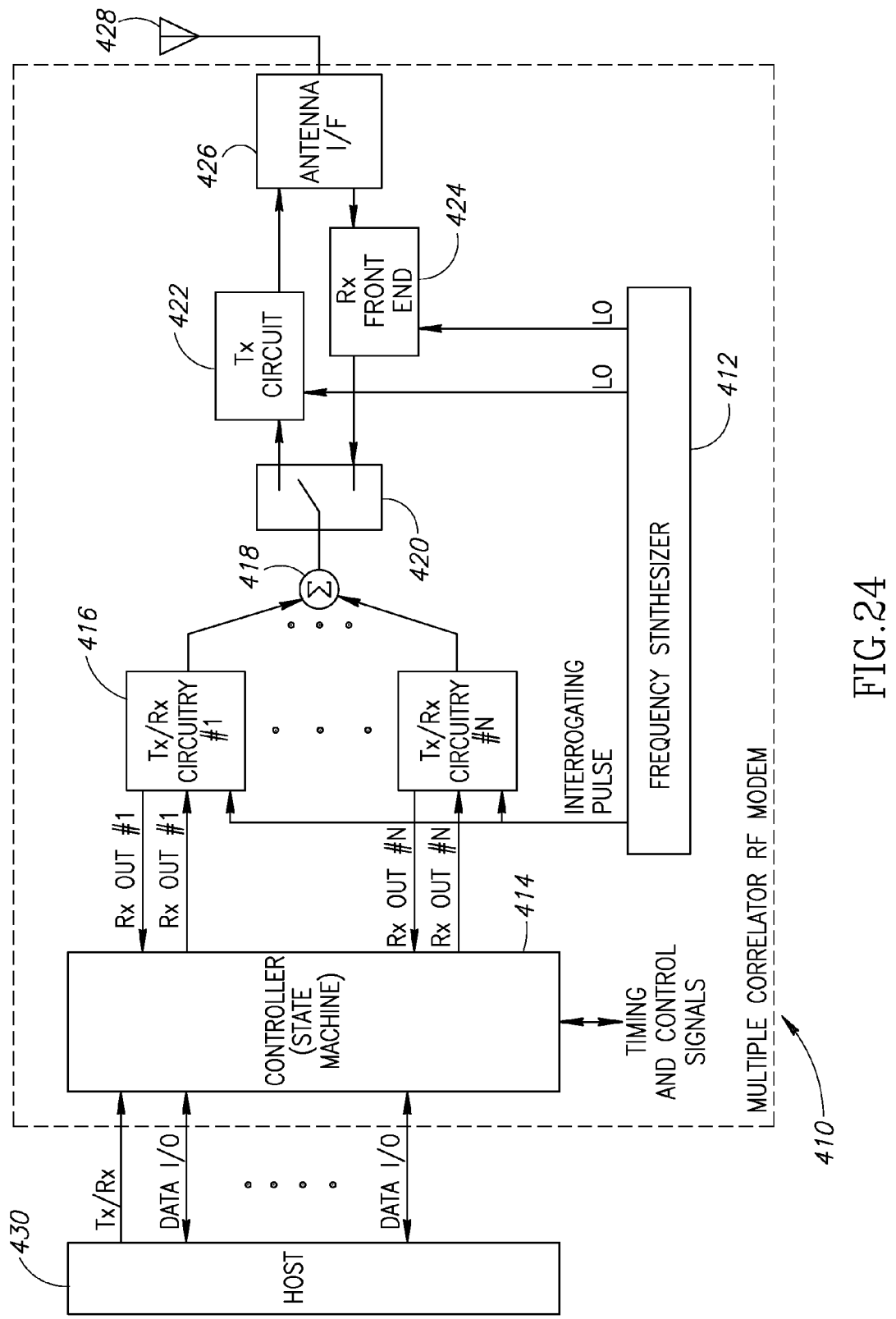
FIG. 24 is a block diagram illustrating a second embodiment of the RF modem of the present invention comprising a plurality of correlators.

A block diagram illustrating a second embodiment of an RF modem constructed in accordance with the present invention comprising a plurality of correlators is shown in FIG. 24. The modem, generally referenced 410, is constructed similarly to the first modem embodiment described supra with the exception that there are now 'N' SAW correlators. The modem 410 comprises a single frequency synthesizer 412 (such as described in connection with to FIG. 8 above) that utilizes any suitable frequency reference source. The IF signal output of the frequency synthesizer 412 feeds a plurality of TX/RX circuits 416, labeled TX/RX circuit #1 through #N.

Each TX/RX circuit receives a TX IN line from a controller 414 and outputs an RX OUT signal thereto. A host 430 provides the data to be transmitted to the controller and to each TX/RX circuit on separate Data I/O signal lines, labeled Data I/O #1 through Data I/O #N. Similarly, the output data from the controller for each TX/RX circuit is input to the host via separate the Data I/O signal lines as well. The host also provides the TX/RX signal to the controller which functions to generate the timing and control signals required by the modem.

A signal line from each TX/RX circuit is connected to an RF power/splitter combiner 418. The device functions as a combiner in the transmit direction and as a splitter in the receive direction. The power splitter/combiner is coupled to a TX/RX switch 420 that functions to divide the signal into transmit and receive paths. During transmission, the switch is configured to input the signal from the TX/RX circuits to the TX circuit 422. During reception, the switch is configured to steer the output of the receive RX front end circuit 424 to the TX/RX circuits. The RF OUT signal from the TX circuit 422 and the RF IN signal to the RX front end circuit 424 are coupled to the antenna 428 via an antenna interface 426.

Figure 25:
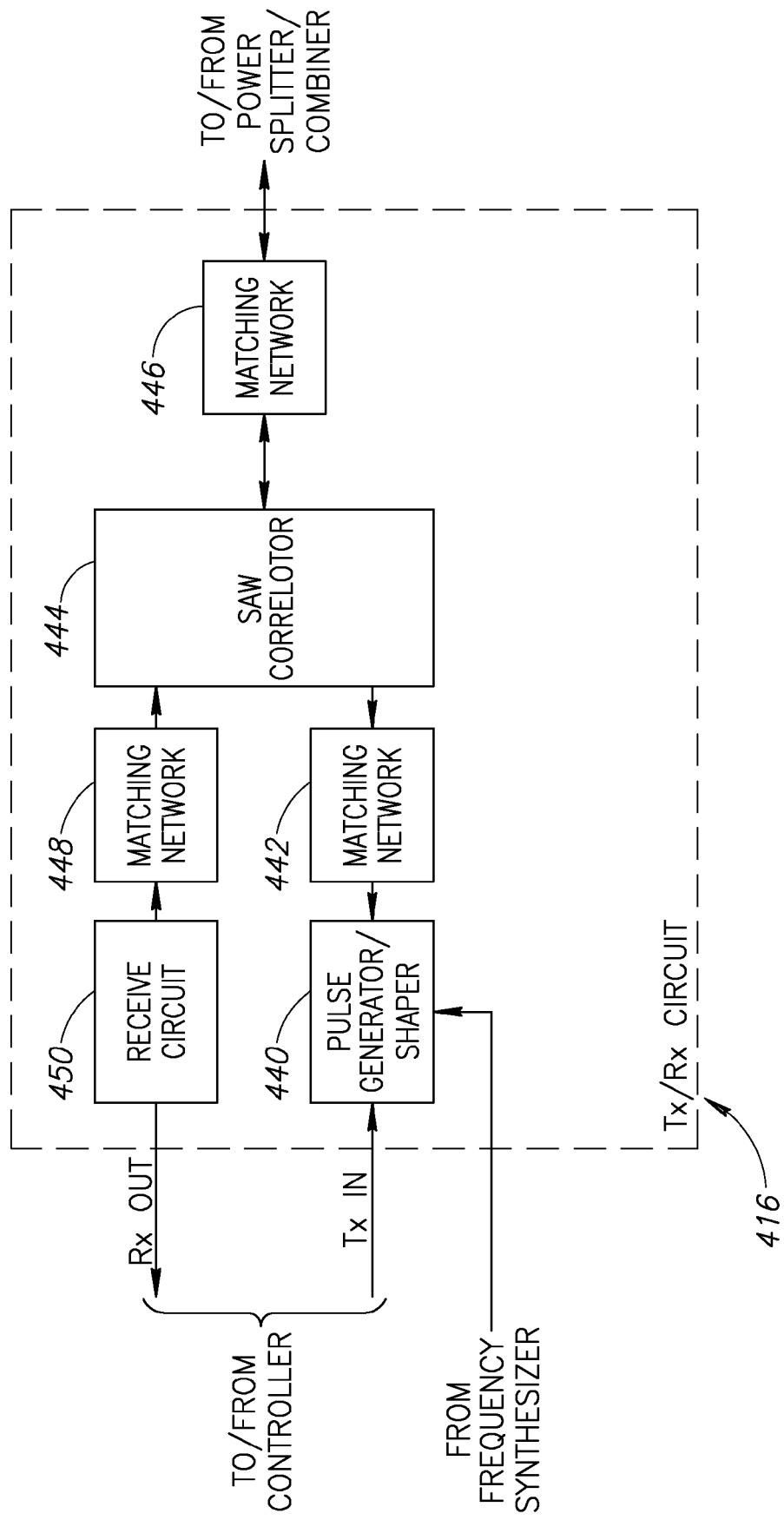
FIG. 25 is a block diagram illustrating the TX/RX circuit of the RF modem of FIG. 24 in more detail.

A block diagram illustrating the TX/RX circuit of the RF modem of FIG. 24 in more detail is shown in FIG. 25. The TX/RX circuit, generally referenced 416, comprises separate transmit path and receive paths. The transmit path comprises a pulse generator/shaper 440 adapted to receive the IF oscillator signal from the frequency synthesizer and the TX IN signal from the controller, matching network 442, SAW correlator 444 and matching network 446. The output of the matching network 446 is input to the power splitter/combiner 418 (FIG. 24).

The receive path comprises matching network 446, SAW correlator 444, matching network 448 and receiver circuit 450. The output of the receive circuit 450 forms the RX OUT signal subsequently input to the controller 414.

Note that the components of the modem 410 including the TX/RX circuit 416 function similarly as like components of the first embodiment of the modem described supra. During transmission, the controller 414 provides transmit data to each TX/RX circuit 416 via the respective TX IN data signal lines. Each circuit incorporates a correlator configured with a unique function (or code) thus preventing interference between the signals generated. The resulting plurality of N signals are combined by the RF power combiner/splitter 418. The combined signal is then processed by the TX circuit and transmitted via antenna 428. The combined signal is upconverted using a mixing circuit as shown in FIG. 12 before being amplified and input to the antenna. The upconversion uses the LO signal provided by the frequency synthesizer.

In the receive path, the received signal is fed from the antenna through the antenna interface 426 to the RX front end circuit 424. Likewise in the receive direction, the signal received form the antenna is downconverted to the IF frequency using the circuit of FIG. 14 before being input to TX/RX switch 420. The downconversion uses the LO signal provided by the frequency synthesizer. The signal is then split by RF power splitter/combiner 418 into N signals. The received signal is input to a correlator in each transmit/receive circuit which functions to output a pulse in accordance with the function configured therein. The pulse is input to individual peak detectors in each receive circuit to generate 'N'

RX OUT signals. The resulting 'N' RX OUT signals are input to the controller which generates the Data I/O signals sent to the host.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A direct sequence spread spectrum radio frequency (RF) modem, comprising:
    a programmable frequency synthesizer adapted to generate an interrogating pulse and a local oscillator (LO) signal, the frequency of said interrogating pulse and LO signals determined in accordance with a frequency control signal;
    a pulse generator adapted to generate a shaped pulse from said interrogating pulse, said pulse generator comprising a first pulse shaping circuit adapted to shape the contour of said shaped pulse;
    a pulse spreader adapted to spread said shaped pulse with a spreading code sequence waveform so as to generate a spread shaped pulse;
    a transmitter circuit including an upconverter for mixing said spread shaped pulse with said local oscillator (LO) signal having an LO frequency to generate a spread spectrum transmission signal at an RF frequency;
    a receiver circuit including a downconverter for mixing a received signal with said LO signal so as to generate a received spread pulse at said IF frequency;
    a correlator adapted to de-spread said received spread pulse in accordance with said code sequence so as to generate a correlator signal; and
    a detector adapted to generate an output signal in response to said correlator signal.

2. The modem according to claim 1, wherein said frequency synthesizer comprises:
    a low frequency reference signal;
    a phase detector adapted to receive said low frequency reference signal;
    a loop filter coupled to the output of said phase detector;
    a voltage controlled oscillator coupled to the output of said loop filter and adapted to generate an output frequency in accordance therewith;
    one or more frequency dividers coupled to said phase detector and adapted to divide the frequencies input to said phase detector in accordance with said frequency control signal.

3. The modem according to claim 1, wherein the frequency of said interrogating pulse is selected from a range of frequencies 480 to 496 MHz.

4. The modem according to claim 1, wherein said LO frequency is selected from a range of frequencies adapted to yield an output RF signal in the 2.4 GHz Industrial Scientific Medial (ISM) band of frequencies.

5. The modem according to claim 1, wherein said pulse generator comprises a gating mechanism for gating said interrogating pulse in accordance with input data to be transmitted.

6. The modem according to claim 1, wherein said spreading means and said correlator means share a surface acoustic wave (SAW) correlator adapted to be used half duplex for transmission and receiving.

7. The modem according to claim 1, wherein said detector comprises:
    a slow peak detector adapted to generate a slowly varying reference signal in accordance with said correlator signal;
    a fast peak detector adapted to track the envelope of said correlator signal and to generate a detection signal therefrom; and
    a decision circuit adapted to generate said output signal by comparing said detection signal against said reference signal.

8. A method of modulating and demodulating a direct sequence spread spectrum signal, said method comprising the steps of:
    generating an interrogating pulse and a local oscillator (LO) signal, said interrogating pulse and LO signals determined in accordance with a frequency control signal;
    generating a shaped pulse from said interrogating pulse, wherein the contours of said pulse are shaped;
    spreading said shaped pulse with a spreading code sequence waveform and generating a spread pulse therefrom;
    mixing said spread pulse with said local oscillator (LO) signal having an LO frequency and generating therefrom a spread spectrum transmission signal at an RF frequency;
    mixing a received signal with said LO oscillator signal and generating therefrom a received spread pulse at an IF frequency;
    de-spreading said spread spectrum transmission signal in accordance with said code sequence and generating a correlator signal therefrom; and
    detecting an output signal in response to said correlator signal.

9. The method according to claim 8, wherein the frequency of said interrogating pulse ranges from 480 to 496 MHz.

10. The method according to claim 8, wherein said LO frequency is selected such that said RF frequency is in the 2.4 GHz Industrial Scientific Medial (ISM) band of frequencies.

11. The method according to claim 8, wherein said step of generating a pulse comprises gating said interrogating pulse in accordance with input data to be transmitted.

12. The method according to claim 8, wherein said step of spreading and de-spreading share the same surface acoustic wave (SAW) correlator adapted to be used half duplex for transmission and receiving.

13. The method according to claim 8, wherein said step of detecting an output signal, comprises the steps of:
    generating a slowly varying reference signal in accordance with said correlator signal;
    tracking the envelope of said correlator signal and generating a detection signal therefrom; and
    generate said output signal by comparing said detection signal against said reference signal.

14. A On/Off Keying (OOK) direct sequence spread spectrum radio frequency (RF) transceiver, comprising:
    an input circuit for generating a fixed duration data input signal in accordance with input data to be transmitted; and
    an RF modem comprising:
    a programmable frequency synthesizer adapted to generate an interrogating pulse and a local oscillator (LO) signal, the frequency of said interrogating pulse and said LO signal determined in accordance with a frequency control signal;

a pulse generator adapted to generate a shaped pulse in response to said data input signal from said interrogating pulse having an IF frequency, said pulse generator comprising a first pulse shaping circuit adapted to shape the contour of said shaped pulse;

a pulse spreader adapted to spread said shaped pulse with a spreading code sequence waveform so as to generate a spread pulse;

a transmitter circuit including an upconverter for mixing said spread pulse with said local oscillator (LO) signal having an LO frequency so as to generate a spread spectrum transmission signal at an RF frequency;

a receiver circuit including a downconverter for mixing a received signal with said LO oscillator signal so as to generate a received spread pulse at said IF frequency;

a correlator adapted to de-spread said spread spectrum transmission signal in accordance with said code sequence so as to generate a correlator signal; and a detector adapted to generate a data output signal in response to said correlator signal.

15. A Pulse Width Modulation (PWM) direct sequence spread spectrum radio frequency (RF) transceiver, comprising:

an input circuit for generating a pulse width modulated data input signal in accordance with an analog input signal to be transmitted;

an RF modem comprising:

a programmable frequency synthesizer adapted to generate an interrogating pulse and a local oscillator (LO) signal, the frequency of said interrogating pulse and said LO signal determined in accordance with a frequency control signal;

a pulse generator adapted to generate a shaped pulse in response to said data input signal from said interrogating pulse having an IF frequency, said pulse generator comprising a first pulse shaping circuit adapted to shape the contour of said shaped pulse;

a pulse spreader adapted to spread said shaped pulse with a spreading code sequence waveform so as to generate a spread pulse;

a transmitter circuit including an upconverter for mixing said spread pulse with said local oscillator (LO) signal having an LO frequency so as to generate a spread spectrum transmission signal at an RF frequency;

a receiver circuit including a downconverter for mixing a received signal with said LO oscillator signal so as to generate a received spread pulse at said IF frequency;

a correlator adapted to de-spread said spread spectrum transmission signal in accordance with said code sequence so as to generate a correlator signal;

a detector adapted to generate an output signal in response to said correlator signal; and an output circuit operative to integrate said output signal so as to generate an analog output signal therefrom.

16. A Pulse Position Modulation (PPM) direct sequence spread spectrum radio frequency (RF) transceiver, comprising:

an input circuit for generating a pulse position modulated data input signal in accordance with an analog input signal to be transmitted;

an RF modem comprising:

a programmable frequency synthesizer adapted to generate an interrogating pulse and a local oscillator (LO) signal, the frequency of said interrogating pulse and said LO signal determined in accordance with a frequency control signal;

a pulse generator adapted to generate a shaped pulse in response to said data input signal from said interrogating pulse having an IF frequency, said pulse generator comprising a first pulse shaping circuit adapted to shape the contour of said shaped pulse;

a pulse spreader adapted to spread said shaped pulse with a spreading code sequence waveform so as to generate a spread pulse;

a transmitter circuit including an upconverter for mixing said spread pulse with said local oscillator (LO) signal having an LO frequency so as to generate a spread spectrum transmission signal at an RF frequency;

a receiver circuit including a downconverter for mixing a received signal with said LO oscillator signal so as to generate a received spread pulse at said IF frequency;

a correlator adapted to de-spread said spread spectrum transmission signal in accordance with said code sequence so as to generate a correlator signal;

a detector adapted to generate an output signal in response to said correlator signal; and an output circuit operative to threshold said output signal against a ramp function so as to generate an analog output signal therefrom.

17. A direct sequence spread spectrum radio frequency (RF) modem, comprising:

a programmable frequency synthesizer operative to generate an interrogating pulse and a local oscillator (LO) signal, the frequency of said interrogating pulse and LO signals determined in accordance with a frequency control signal;

a plurality of N transmit/receive circuits, each said transmit/receive circuit comprising:

a pulse generator adapted to generate a shaped pulse from said interrogating pulse, said pulse generator comprising a first pulse shaping circuit adapted to shape the contour of said shaped pulse;

a pulse spreader adapted to spread said shaped pulse with a spreading code sequence waveform so as to generate a spread pulse;

a correlator adapted to de-spread said spread pulse signal in accordance with said code sequence so as to generate a correlator signal;

a detector adapted to generate an output signal in response to said correlator signal;

wherein the correlator in each transmit/receive circuit is configured with a unique function substantially orthogonal to functions in other correlators;

means for combining and transmitting the N spread pulse signals generated by said N transmit/receive circuits as a combined transmission signal;

a transmitter circuit including an upconverter for mixing said spread pulse with said LO signal so as to generate a spread spectrum transmission signal at an RF frequency;

means for receiving and splitting said combined transmission signal into N receive signals;

a receiver circuit including a downconverter for mixing a received signal with said LO signal so as to generate a received spread pulse at said IF frequency; and wherein N is a positive integer.

18. The modem according to claim 17, wherein said frequency synthesizer comprises:

a voltage controlled oscillator (VCO) operative to generate an output frequency in accordance with a control input;

a reference frequency divider coupled to a reference frequency source;

frequency divider means coupled to the output of said VCO;

a phase detector coupled to the output of said reference frequency divider and said frequency divider means; and a loop filter coupled to the output of said phase detector.

19. The modem according to claim 17, wherein said pulse spreader and said correlator share the same surface acoustic wave (SAW) correlator adapted to be used half duplex for transmission and receiving.

20. The modem according to claim 17, wherein the frequency of said interrogating pulse ranges from 480 to 496 MHz.

21. The modem according to claim 17, wherein said LO frequency is selected from a range of frequencies adapted to yield an output RF signal in the 2.4 GHz Industrial Scientific Medial (ISM) band of frequencies.

22. The modem according to claim 17, wherein said pulse generator comprises a gating mechanism for gating said interrogating pulse in accordance with input data to be transmitted.

23. The modem according to claim 17, wherein said first pulse shaping circuit adapted to generate said pulse contour comprising a first portion that linearly ramps the amplitude of said pulse from a low to a high value and a second portion that linearly ramps the amplitude of said pulse from a high to a low value.

24. The modem according to claim 17, wherein said detector comprises:

a slow peak detector adapted to generate a slowly varying reference signal in accordance with said correlator signal;

a fast peak detector adapted to track the envelope of said correlator signal and to generate a detection signal therefrom; and a decision circuit adapted to generate said output signal by comparing said detection signal against said reference signal.

* * * * *